US011180194B2

(12) United States Patent
Wang et al.

(10) Patent No.: US 11,180,194 B2
(45) Date of Patent: Nov. 23, 2021

(54) VEHICLE BODY AND VEHICLE

(71) Applicant: GREAT WALL MOTOR COMPANY LIMITED, Hebei (CN)

(72) Inventors: Changyi Wang, Baoding (CN); Zengshou Liu, Baoding (CN); Lu Zhang, Baoding (CN); Hui Zong, Baoding (CN); Xiaoying Li, Baoding (CN); Siyuan Dong, Baoding (CN); Xiaoxu Han, Baoding (CN); Wei Wei, Baoding (CN); Haopeng Guo, Baoding (CN)

(73) Assignee: GREAT WALL MOTOR COMPANY LIMITED, Baoding (CN)

( * ) Notice: Subject to any disclaimer, the term of this patent is extended or adjusted under 35 U.S.C. 154(b) by 190 days.

(21) Appl. No.: 16/583,669

(22) Filed: Sep. 26, 2019

(65) Prior Publication Data

US 2020/0062310 A1    Feb. 27, 2020

Related U.S. Application Data

(63) Continuation of application No. PCT/CN2018/081267, filed on Mar. 30, 2018.

(30) Foreign Application Priority Data

Mar. 31, 2017  (CN) .......................... 201710210120.8

(51) Int. Cl.
*B62D 21/15*  (2006.01)
*B62D 25/14*  (2006.01)
*B62D 25/20*  (2006.01)

(52) U.S. Cl.
CPC ......... *B62D 21/152* (2013.01); *B62D 25/145* (2013.01); *B62D 25/2009* (2013.01)

(58) Field of Classification Search
CPC ...... B62D 21/15; B62D 21/152; B62D 25/14; B62D 25/145; B62D 25/20; B62D 25/2009

See application file for complete search history.

(56) References Cited

U.S. PATENT DOCUMENTS 8,720,983 B1    5/2014  Edwards et al.
8,985,681 B2 *  3/2015  Fujii ................. B62D 25/2018
                                                          296/204

(Continued)

FOREIGN PATENT DOCUMENTS

CN    201165251 Y    12/2008
CN    101722993 A     6/2010

(Continued)

OTHER PUBLICATIONS

Office Action dated Aug. 5, 2019 in corresponding Chinese Application No. 201710210120.8; 20 pages including English-language translation.

(Continued)

*Primary Examiner* — Lori L Lyjak
(74) *Attorney, Agent, or Firm* — Maier & Maier, PLLC

(57) ABSTRACT

Provided are a vehicle body and a vehicle. The vehicle body includes: two A pillars; a front impact beam; two front longitudinal beams having front ends connected to the front impact beam, and each of the front longitudinal beams being connected to the A-pillar at the same side therewith by means of a plurality of force transmission paths; a dash panel having lower portion provided with a dash centre aisle and connected to the two A-pillars; an dash upper cross member provided at an upper portion of the dash panel; a dash lower vertical member having an upper end connected to the dash upper cross member and a lower end extending to the dash centre aisle; and two front floor longitudinal beams.

17 Claims, 14 Drawing Sheets

(56) References Cited

U.S. PATENT DOCUMENTS

| | | | | |
|---|---|---|---|---|
| 2009/0200784 A1* | 8/2009 | Braun | ................... | B62D 25/14 |
| | | | | 280/779 |
| 2012/0001448 A1* | 1/2012 | Da Costa Pito | ..... | B62D 25/145 |
| | | | | 296/72 |
| 2012/0049573 A1* | 3/2012 | Atsumi | ................ | B62D 25/145 |
| | | | | 296/193.02 |
| 2012/0049574 A1* | 3/2012 | Atsumi | ................ | B62D 25/145 |
| | | | | 296/193.02 |
| 2015/0175216 A1* | 6/2015 | Hisazumi | ............. | B62D 25/082 |
| | | | | 296/192 |
| 2016/0137228 A1* | 5/2016 | Atsumi | ................. | B62D 25/20 |
| | | | | 296/204 |
| 2016/0236714 A1 | 8/2016 | Tatsuwaki et al. | | |
| 2017/0166258 A1* | 6/2017 | Kim | .................... | B62D 25/082 |

FOREIGN PATENT DOCUMENTS

| CN | 103935402 A | 7/2014 |
|---|---|---|
| CN | 105313972 A | 2/2016 |
| CN | 205010326 U | 2/2016 |
| CN | 205131387 U | 4/2016 |
| CN | 205273623 U | 6/2016 |
| CN | 205769599 U | 12/2016 |
| CN | 205854288 U | 1/2017 |
| CN | 206623884 U | 11/2017 |
| CN | 206623891 U | 11/2017 |
| KR | 1020110058922 A | 6/2011 |
| WO | 2014069373 A1 | 5/2014 |

OTHER PUBLICATIONS

Office Action dated Apr. 2, 2020 in corresponding Chinese Application No. 201710210120.8; 24 pages including English-language translation.

Translation of International Search Report dated Jun. 22, 2018 and Written Opinion in corresponding International Application No. PCT/CN2018/081267; 10 pages.

Extended European Search Report dated Nov. 25, 2020, in connection with corresponding EP Application No. 18775221.7; 10 pages.

Indian Office Action dated Dec. 16, 2020, in connection with corresponding IN Application No. 201937043707; 6 pages.

* cited by examiner

Rear ⟵⟶ Front

D-D

F-F

G-G

VEHICLE BODY AND VEHICLE

CROSS-REFERENCE TO RELATED APPLICATION

The present application is a national phase entry under 35 USC § 371 of International Application PCT/CN2018/081267, filed on Mar. 30, 2018, which claims the benefit of and priority to Chinese Patent Application No. 201710210120.8, filed on Mar. 31, 2017, the entire disclosures of which are incorporated herein by reference.

FIELD

The disclosure relates to a field of vehicle technology, and particularly to a vehicle body and a vehicle having the vehicle body.

BACKGROUND

With continuous development of society, people pay more attention to vehicle crash safety. Firewalls are strengthened in more and more vehicles, and longitudinal beams are designed with energy absorption and collapsing structures to improve the safety performance of vehicles. Although a dash intrusive amount may be reduced after a crash to a certain extent, the increase to surviving space is limited, and it is still unable to resolve and transmit an applied force effectively, which does not fundamentally solve the problem of single force transmission path and low force transmission efficiency.

SUMMARY

Based on the above, the present disclosure aims to provide a vehicle body to solve the problem of single force transmission path and low force transmission efficiency.

To achieve the above objective, a technical scheme of the present disclosure is realized as follows.

A vehicle body includes: two A-pillars; a front impact beam; two front longitudinal beams having front ends connected to two ends of the front impact beam respectively, each of the front longitudinal beams being connected to the A column at same side therewith by means of a plurality of force transmission paths; a dash panel connected to rear ends of the two front longitudinal beams, having a lower portion provided with a dash centre aisle, and connected to the two A-pillars; a dash upper cross member arranged at an upper portion of the dash panel; a dash lower vertical member having an upper end connected to the dash upper cross member and a lower end extending to the dash centre aisle; and two front floor longitudinal beams, each of the front floor longitudinal beams having a front end connected to the rear end of the front longitudinal beam at same side therewith and having a linear configuration.

Furthermore, the vehicle body further includes two upper side beams, each of the upper side beams having a rear end connected to the A-pillar at same side therewith, and a plurality of connecting parts being provided between each of the upper side beams and the front longitudinal beam at same side therewith to enable the front longitudinal beam to be connected to the A-pillar by means of the plurality of force transmission paths.

Furthermore, the plurality of connecting parts include a first bracket extending in a left-right direction, having an inner end connected to an outer side of the front longitudinal beam, and adjacent to the front end of front longitudinal beam, and the upper side beam has a front lower end connected to an outer end of the first bracket.

Furthermore, the first bracket includes a first bracket plate and a second bracket plate, the first bracket plate is in a shape of U, and the second bracket plate is fixed to an opening of the first bracket plate and seals the opening.

Furthermore, the plurality of connecting parts include a second bracket connected between the upper side beam and the front longitudinal beam at same side therewith, and connection between the second bracket and the upper side beam is arranged at an rear upper position relative to connection between the first bracket and the upper side beam.

Furthermore, the second bracket includes a first connecting piece and a second connecting piece, the first connecting piece extends in a left-right direction and is connected between the upper side beam and the second connecting piece, and the second connecting piece extends in an upper-lower direction and has a lower end connected to the front longitudinal beam.

Furthermore, the vehicle body further includes a front end closing structure connected to the front longitudinal beam by means of the second connecting piece.

Furthermore, the first bracket, the second bracket, a portion of the upper side beam located between the first bracket and the second bracket, and a portion of the front longitudinal beam located between the first bracket and the second bracket form a three-dimensional quadrangle.

Furthermore, the plurality of connecting parts further include a third bracket connected between the upper side beam and the front longitudinal beam at same side, and connection between the third bracket and the upper side beam is arranged at a rear portion relative to connection between the second bracket and the upper side beam.

Furthermore, the upper side beam includes an arc segment and a straight segment, the arc segment is connected in front of the straight segment, the first bracket and second bracket are connected to the arc segment, the third bracket is connected to the straight segment, and the straight segment is connected to the A-pillar in rear.

Furthermore, the vehicle body further includes: two rocker panels, each of the rocker panel having a front end connected to the rear end of the front longitudinal beam at same side therewith; and two rear floor longitudinal beams, each of the rear floor longitudinal beams being connected to a rear end of the front floor longitudinal beam at same side therewith and a rear end of the rocker panel to make the front floor longitudinal beam, the rocker panel, and the rear floor longitudinal beam form a closed-loop force transmission structure.

Furthermore, the rear floor longitudinal beam includes a front segment, a middle segment, and a rear segment, the front segment is connected to the rear end of the front floor longitudinal beam, the middle segment is connected to the rear end of the rocker panel, and the rear segment extends backwards from the middle segment to a rear subframe.

Furthermore, a width of the middle segment is larger than a width of the front segment, and an outer wall of the middle segment abuts an inner wall of the rocker panel and is fixed to the inner wall of the rocker panel.

Furthermore, the vehicle body further includes a floor centre aisle and a rear floor cross member, the floor centre aisle being connected between the rear end of the front longitudinal beam and the rear floor cross member, the rear floor cross member being further connected to the rear floor longitudinal beam to form a closed-loop force transmission structure with the floor centre aisle, the front floor longitudinal beam, and the rear floor longitudinal beam.

Furthermore, the floor centre aisle is provided with a centre aisle force transmission path extending along a front-rear direction.

Furthermore, the centre aisle force transmission path is a groove.

Furthermore, the lower end of the dash lower vertical member is welded to the dash centre aisle.

Furthermore, when a vehicle is in frontal crash, an impact force on the front impact beam is transmitted to the two front longitudinal beams in rear, each of the front longitudinal beams then transmits the impact force to the dash panel, to the A-pillar at same side therewith by means of the plurality of force transmission paths at the same side, and also to the front floor longitudinal beam at the same side, and the impact force transmitted to the A-pillar is transmitted to the dash centre aisle by means of the dash upper cross member and the dash lower vertical member.

Furthermore, when a vehicle is in side crash, the A-pillar located at a crash side transmits an impact force to the other side by means of the dash upper cross member, and to the dash lower vertical member and the dash centre aisle by means of the dash upper cross member.

Furthermore, when a vehicle is in offset crash, the first bracket transmits an impact force to the front longitudinal beam to enable the front longitudinal beam deforms towards an outer side of the vehicle.

Furthermore, when a vehicle is in frontal crash, an impact force on the front impact beam is transmitted to the two front longitudinal beams in rear, each of the front longitudinal beams then transmits the impact force to the dash panel, to the A-pillar at same side therewith by means of the plurality of force transmission paths at the same side, and also to the front floor longitudinal beam at the same side, and the impact force transmitted to the A-pillar is transmitted to the dash centre aisle by means of the dash upper cross member and the dash lower vertical member; and the impact force transmitted to the front longitudinal beam is also transmitted to the rear floor longitudinal beam by means of the rocker panel at the same side.

Furthermore, when a vehicle is in frontal crash, an impact force on the front impact beam is transmitted to the two front longitudinal beams in rear, each of the front longitudinal beams then transmits the impact force to the dash panel, to the A-pillar at the same side therewith by means of the plurality of force transmission paths at the same side, and also to the front floor longitudinal beam at the same side, the impact force transmitted to the A-pillar is transmitted to the dash centre aisle by means of the dash upper cross member and the dash lower vertical member; and the impact force transmitted to the front longitudinal beam is also transmitted to the rear floor longitudinal beam by means of the floor centre aisle and the rear floor cross member at the same side.

Relative to the related art, the vehicle body according to the present disclosure has the following advantages.

The vehicle body according to the present disclosure is provided with a plurality of force transmission paths, the applied force can be absorbed and resolved quickly and efficiently, thereby effectively dispersing the impact force that is transmitted backwards. Thus, the intrusive amount of the dash panel can be significantly reduced, which may avoid serious damage to the vehicle body and better ensure a sufficient surviving space for the passenger compartment.

Another objective of the present disclosure is to provide a vehicle.

To achieve above objective, the technical scheme is realized as follows.

A vehicle includes the above vehicle body.

The advantages of the vehicle and those of the above vehicle body are the same relative to the related art, which will not be described herein.

BRIEF DESCRIPTION OF THE DRAWINGS

The accompanying drawings constituting as a part of the present disclosure are used to provide a further understanding of the present disclosure. The exemplary embodiments of the present disclosure and their explanations are used to explain the present disclosure, which do not constitute as improper limitation of the present disclosure. In the drawings.

Figure 1:
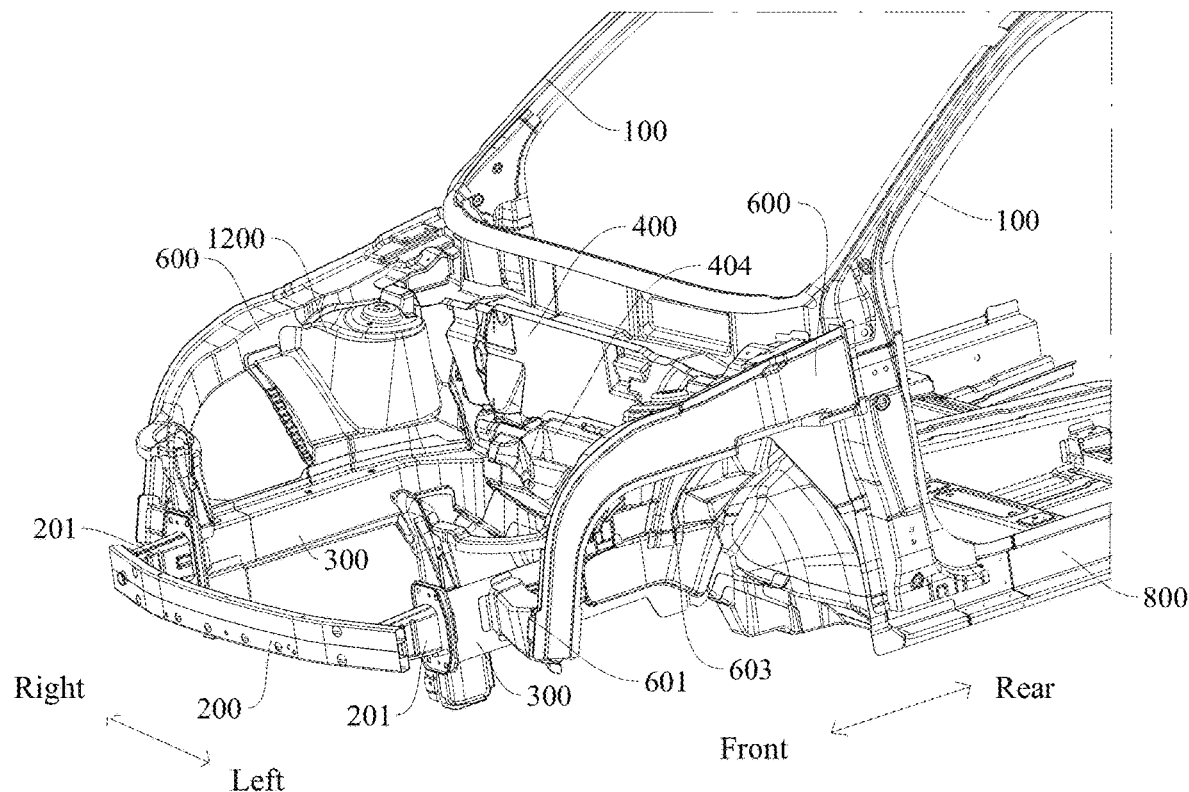
FIGS. 1-3 are partially schematic views of a vehicle body according to an embodiment of the present disclosure at different angles respectively.

REFERENCE NUMERALS vehicle body 10000;
A-pillar 100;
front impact beam 200; energy absorber 201;
front longitudinal beam 300;

dash panel 400; dash centre aisle 401; dash upper cross member 402; dash lower vertical member 403; dash middle cross member 404; dash lower panel 405; dash upper panel 406;

front floor longitudinal beam 500;

upper side beam 600; first bracket 601; first bracket plate 6011; second bracket plate 6012;

second bracket 602; first connecting piece 6021; second connecting piece 6022; third bracket 603; arc segment 604; straight segment 605;

front end closing structure 700;

rocker panel 800; front torsion box 801;

rear floor longitudinal beam 900; front segment 901; middle segment 902; rear segment 903;

floor centre aisle 1000; centre aisle force transmission path 1001; centre aisle connecting plate 1002;

rear floor cross member 1100;

wheelhouse 1200;

wheelhouse reinforcing member 1300; first part 1301; second part 1302;

side wall 1400; connecting piece 1500;

seat front cross member 1601; seat rear cross member 1602; seat front connecting plate 1603; outer connecting plate 1605; inner connecting plate 1606; reinforcing rib 1607; lapping edge 1608;

floor upper longitudinal beam 1700.

DETAILED DESCRIPTION

It should be noted that, in the case of non-contradiction, the embodiments of the present disclosure and the features of the embodiments may be combined with each other.

A vehicle body 10000 of embodiments of the present disclosure will be described in detail as follows with reference to FIGS. 1-23 and in combination with the embodiments.

According to the embodiments of the present disclosure, a vehicle body 10000 may include two A-pillars 100, a front impact beam 200, two front longitudinal beams 300, a dash panel 400, a dash upper cross member 402, a dash lower vertical member 403, and two front floor longitudinal beams 500. Certainly, the vehicle body 10000 may also include other components, such as an upper side beam 600, a rocker panel 800, and a rear floor longitudinal beam 900, etc.

As illustrated in FIG. 1, front ends of the two front longitudinal beams 300 are connected at two ends of the front impact beam 200 respectively. Specifically, energy absorbers 201 are arranged between the front ends of the two front longitudinal beams 300 and the two ends of the front impact beam 200. The energy absorbers 201 can absorb energy when the vehicle is in frontal crash, thereby reducing an impact force that is transmitted backwards and improving passenger's safety.

Each of the front longitudinal beams 300 is connected to the A-pillar 100 at the same side therewith by means of a plurality of force transmission paths. The term "same side" herein means that the front longitudinal beam 300 at the left side is connected to the A-pillar 100 at the left side, and the front longitudinal beam 300 at the right side is connected to the A-pillar 100 at the right side. The force transmission path is a path along which the impact force is transmitted, which may be a physical component. It should be understood that by means of arranging a plurality of force transmission paths, the force transmission paths increase, such that the applied force can be absorbed and resolved quickly and efficiently, thereby effectively dispersing the impact force that is transmitted backwards. Thus, the intrusive amount of the dash panel 400 can be significantly reduced, which can avoid serious damage to the vehicle body 10000, thereby better ensuring a sufficient surviving space for a passenger compartment. The specific layout of the force transmission path is described in detail as follows.

Figure 4:
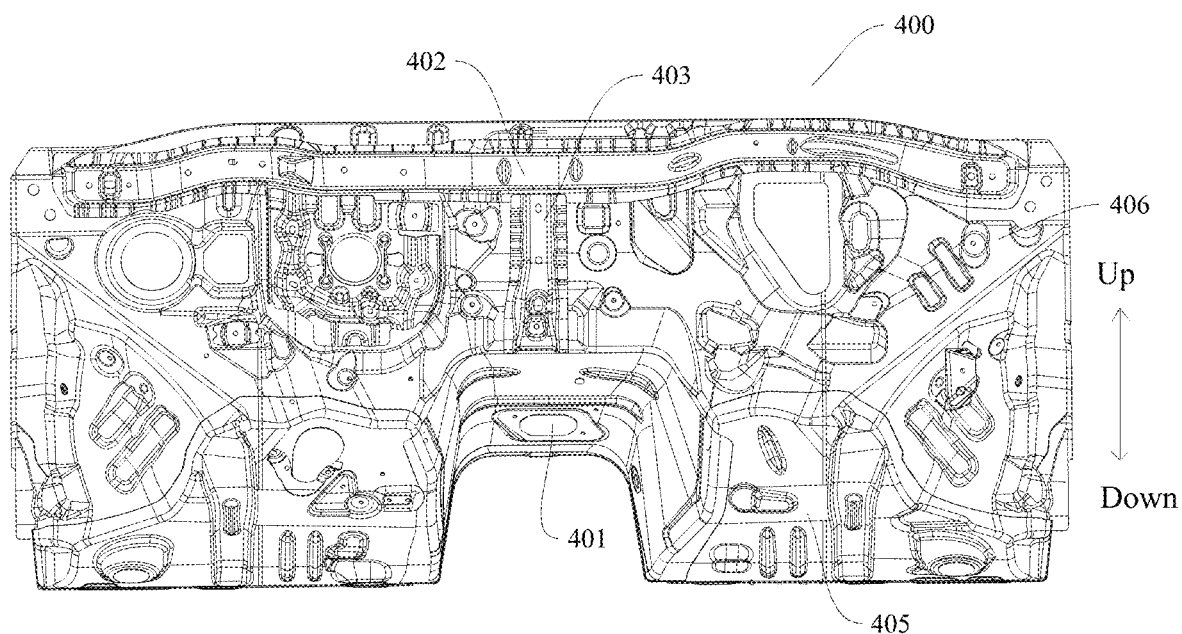
FIG. 4 is a rear view of a dash panel of a vehicle body according to an embodiment of the present disclosure.
Figure 5:
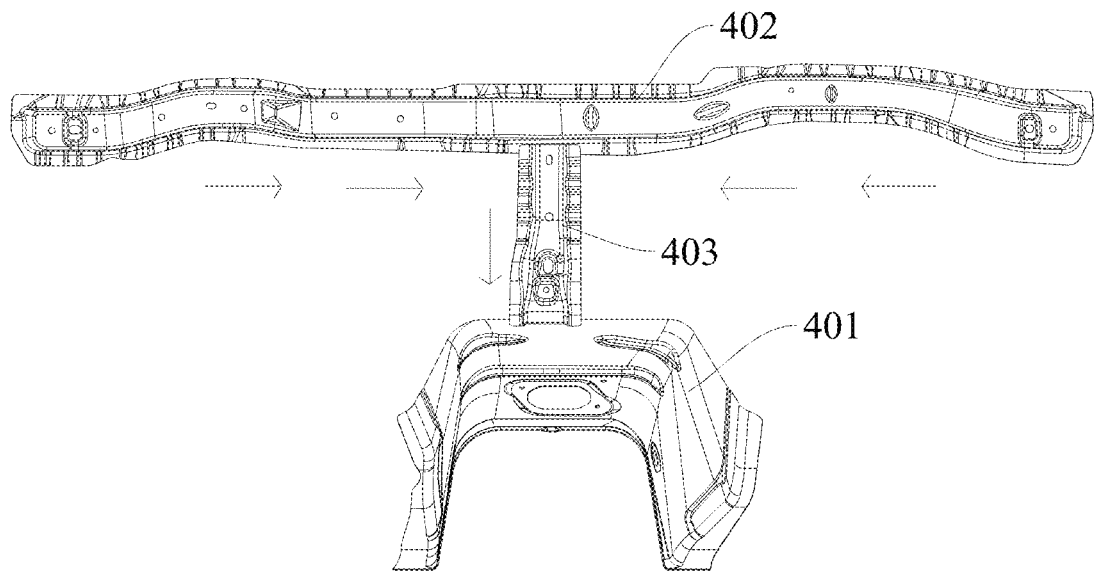
FIG. 5 is a view of the connection among a dash upper cross member, a dash lower vertical member and a dash centre aisle.
Figure 6:
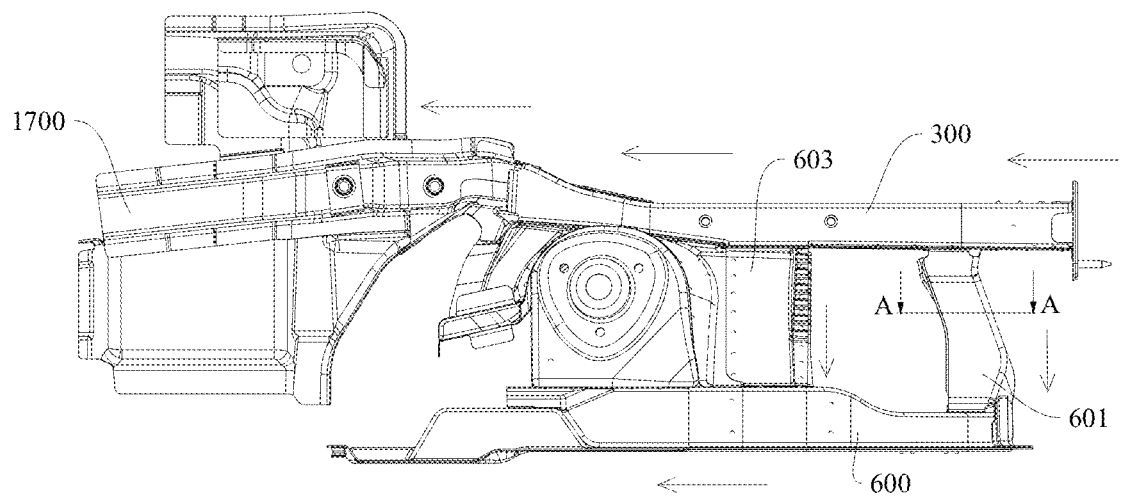
FIG. 6 is a top view of the cooperation between a front longitudinal beam and an upper side beam.

Rear ends of the two front longitudinal beams 300 are connected on the dash panel 400, such that the impact force can be transmitted to the dash panel 400 by means of the front impact beam 200 and the front longitudinal beam 300 when the vehicle is in frontal crash. The dash panel 400 is connected to two A-pillars 100. As illustrated in FIGS. 4 and 5, the dash upper cross member 402 is arranged at an upper portion of the dash panel 400. The dash panel 400 herein includes a dash upper panel 406 and a dash lower panel 405. The dash upper panel 406 is arranged above the dash lower panel 405. The dash upper panel 406 is configured as the upper portion of the dash panel 400, and the dash lower panel 405 is configured as a lower portion of the dash panel 400. The dash upper cross member 402 may be arranged at an upper end of the dash upper panel 406. It should be noted that the dash upper cross member 402 is arranged on a rear surface of the dash upper panel 406.

Figure 24:
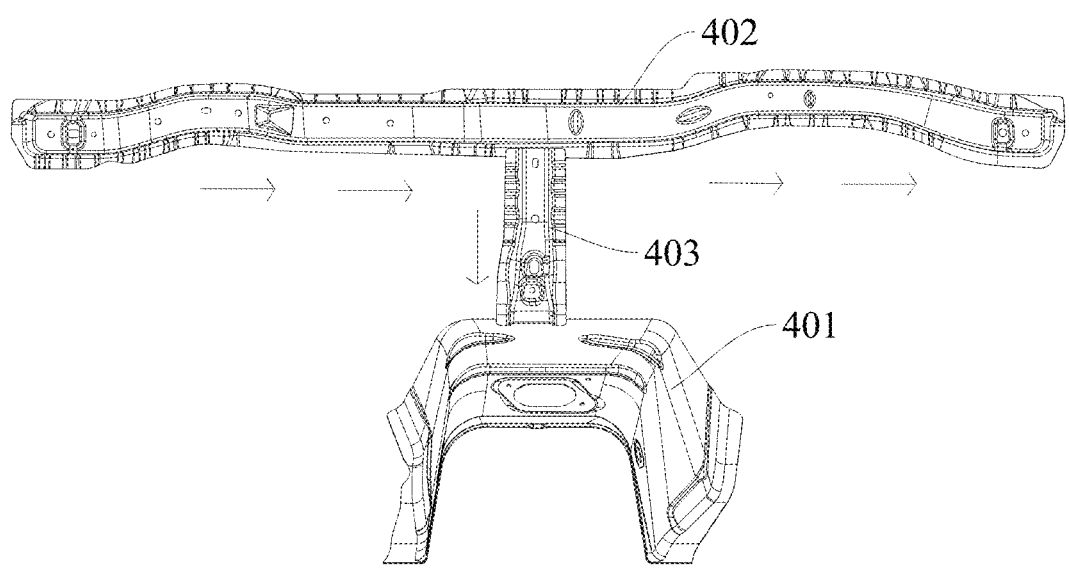
FIG. 24 is a schematic view of impact force transmission along a dash upper cross member, a dash lower vertical member, and a dash centre aisle when the vehicle is in side crash.

As illustrated in FIGS. 5 and 24, the lower portion of the dash panel 400 is provided with a dash centre aisle 401. An upper end of the dash lower vertical member 403 is connected to the dash upper cross member 402, and a lower end of the dash lower vertical member 403 extends to the dash centre aisle 401. Optionally, the lower end of the dash lower vertical member 403 may be welded to the dash centre aisle 401, such that the connection between the two is reliable and the force transmission efficiency is high. Thus, the impact force transmitted to the dash upper cross member 402 can be transmitted to the dash centre aisle 401 by means of the dash lower vertical member 403. The dash centre aisle 401 can be connected to a floor centre aisle 1000 on a floor, such that the impact force may be transmitted to the floor, thereby better dispersing the impact force, hence effectively reducing a load on the dash panel 400, and further effectively protecting passenger.

When the vehicle is in frontal crash, the impact force on the front impact beam 200 is transmitted to the two front longitudinal beams 300 in the rear thereof. Each of the front longitudinal beams 300 then transmits the impact force to the dash panel 400, to the A-pillar 100 at the same side therewith by means of a plurality of force transmission paths at the same side therewith, and also to the front floor longitudinal beam 500 at the same side therewith. The impact force transmitted to the A-pillar 100 is transmitted to the dash centre aisle 401 by means of the dash upper cross member 402 and the dash lower vertical member 403.

Specifically, as illustrated in FIG. 5, when the vehicle is in frontal crash, the impact force is transmitted from two ends of the dash upper cross member 402 to a midpoint, and then to the dash lower vertical member 403. The dash lower vertical member 403 can also transmit the impact force to the dash centre aisle 401.

Certainly, when the vehicle is in side crash, the A-pillar arranged at a crash side transmits the impact force to the other side by means of the dash upper cross member 402, and to the dash lower vertical member 403 and the dash centre aisle 401 by means of the dash upper cross member 402.

For example, if a left side of the vehicle is crashed, as illustrated in FIG. 24, the impact force is transmitted from a left end of the dash upper cross member 402 to the right. The impact force transmitted to the midpoint of the dash upper cross member 402 has a portion transmitted continuously rightwards and another portion transmitted downwards by means of the dash lower vertical member 403 and the dash centre aisle 401.

A front end of each of the front floor longitudinal beams 500 is connected to a rear end of the front longitudinal beam 300 at the same side therewith, such that the front longitudinal beam 300 can transmit the impact force to the front floor longitudinal beam 500, thereby effectively dispersing the impact force in a front-rear direction of the vehicle. Moreover, each of the front floor longitudinal beams 500 has a linear configuration, and the linear front floor longitudinal beam 500 has high force transmission efficiency. The manufacturing process of the linear front floor longitudinal beam 500 is easy, so as to reduce a manufacturing cost of the front floor longitudinal beam 500.

Figure 12:
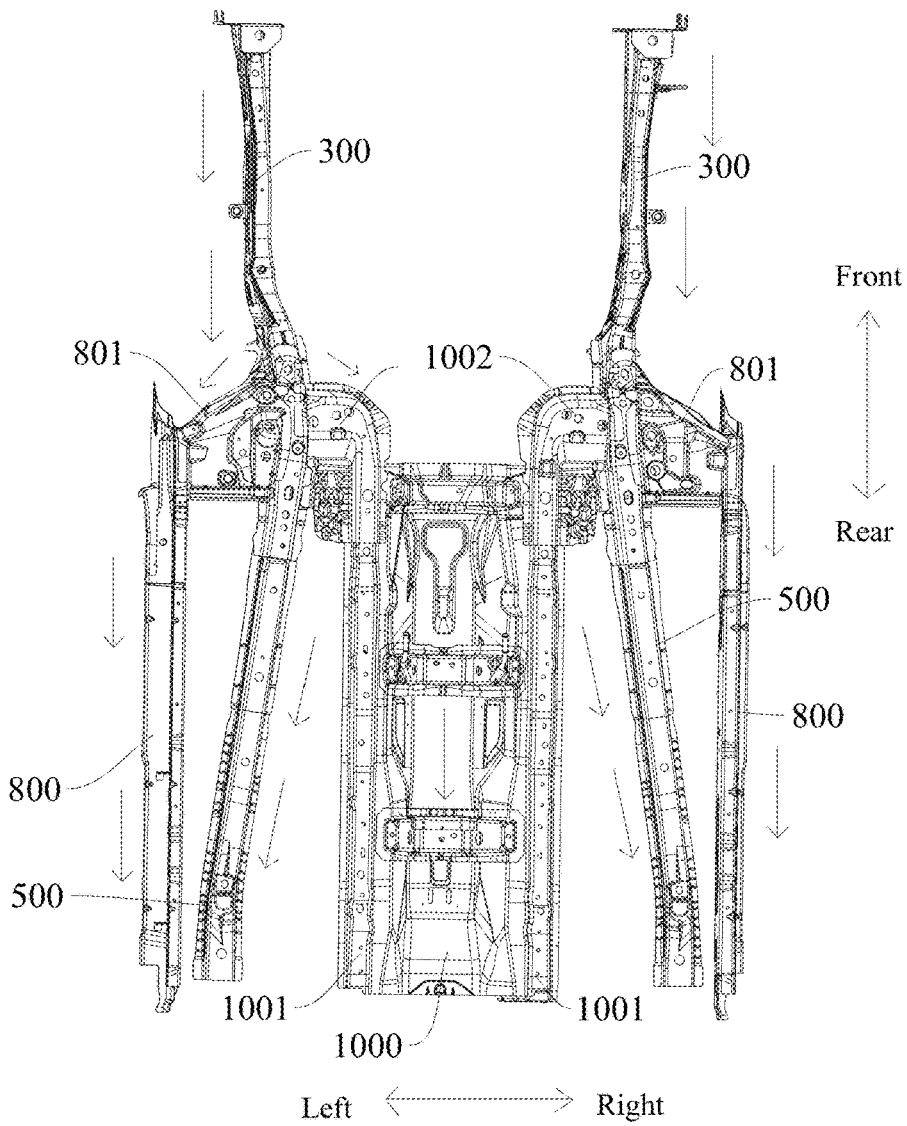
FIG. 12 is a schematic view of the cooperation among a front longitudinal beam, a rocker panel and a front floor longitudinal beam.
Figure 13:
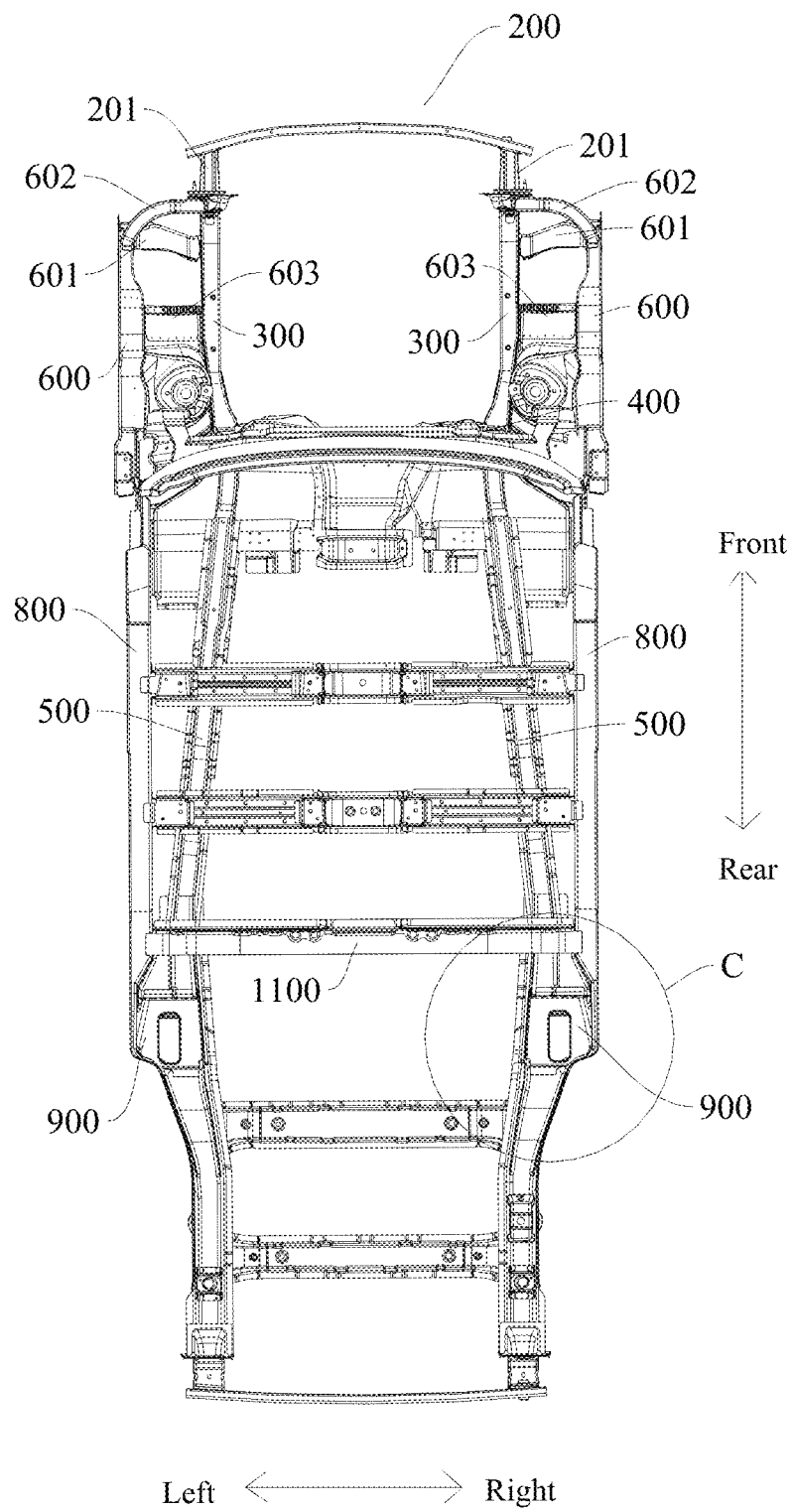
FIG. 13 is a top view of a vehicle body according to an embodiment of the present disclosure.

As illustrated in FIGS. 12 and 13, there may be two rocker panels 800, and a front end of each of the rocker panels 800 is connected to a rear end of the front longitudinal beam 300 at the same side therewith. The rocker panels 800 extend in the front-rear direction, such that the front longitudinal beam 300 may also transmit the impact force to the rocker panels 800, thereby effectively transmitting and resolving the impact force, and improve a crash performance of the vehicle.

There are two rear floor longitudinal beams 900, and each of the rear floor longitudinal beams 900 is connected to a rear end of the front floor longitudinal beam 500 at the same side therewith and a rear end of the rocker panel 800, such that the front floor longitudinal beam 500, the rocker panel 800 and the rear floor longitudinal beam 900 form a closed-loop force transmission structure. Therefore, the impact force transmitted to the front longitudinal beam 300 can be dispersed and transmitted by means of the front floor longitudinal beam 500 and the rocker panel 800, and then the front floor longitudinal beam 500 and the rocker panel 800 transmit the impact force to the rear floor longitudinal beam 900. The rear floor longitudinal beam 900 can transmit the impact force to a subframe, which can effectively enhance the force transmission effect and modality of a lower portion of the vehicle body 10000, so as to improve passenger's safety. It should be noted that the arrangement of the closed-loop force transmission structure can not only improve the force transmission effect, but also improve the structural reliability of the vehicle body 10000.

Figure 2:
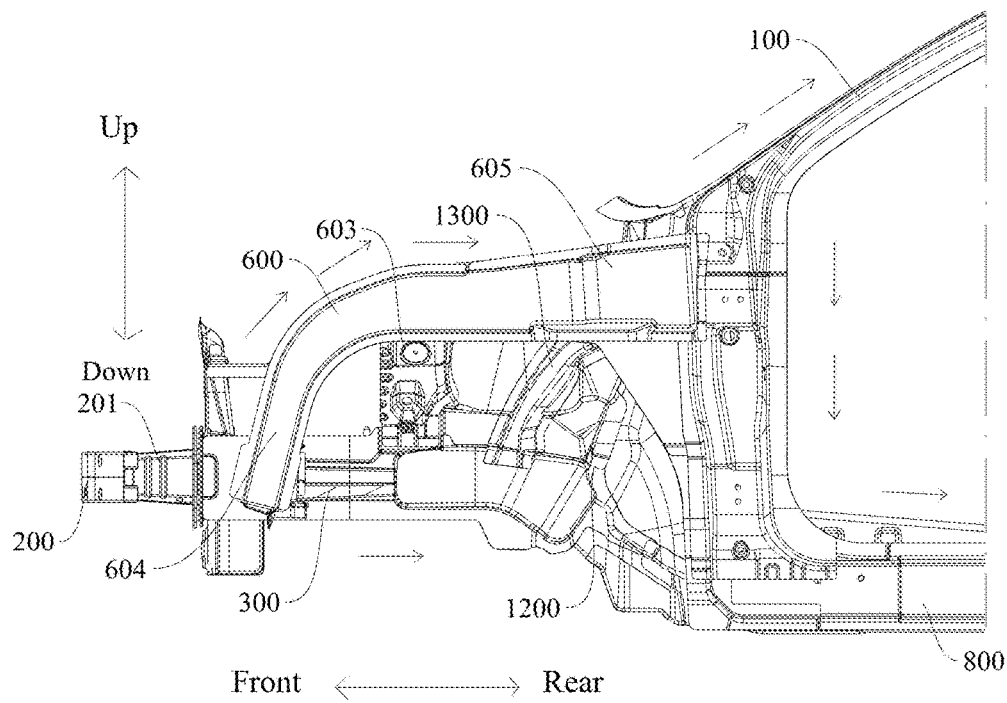
Figure 3:
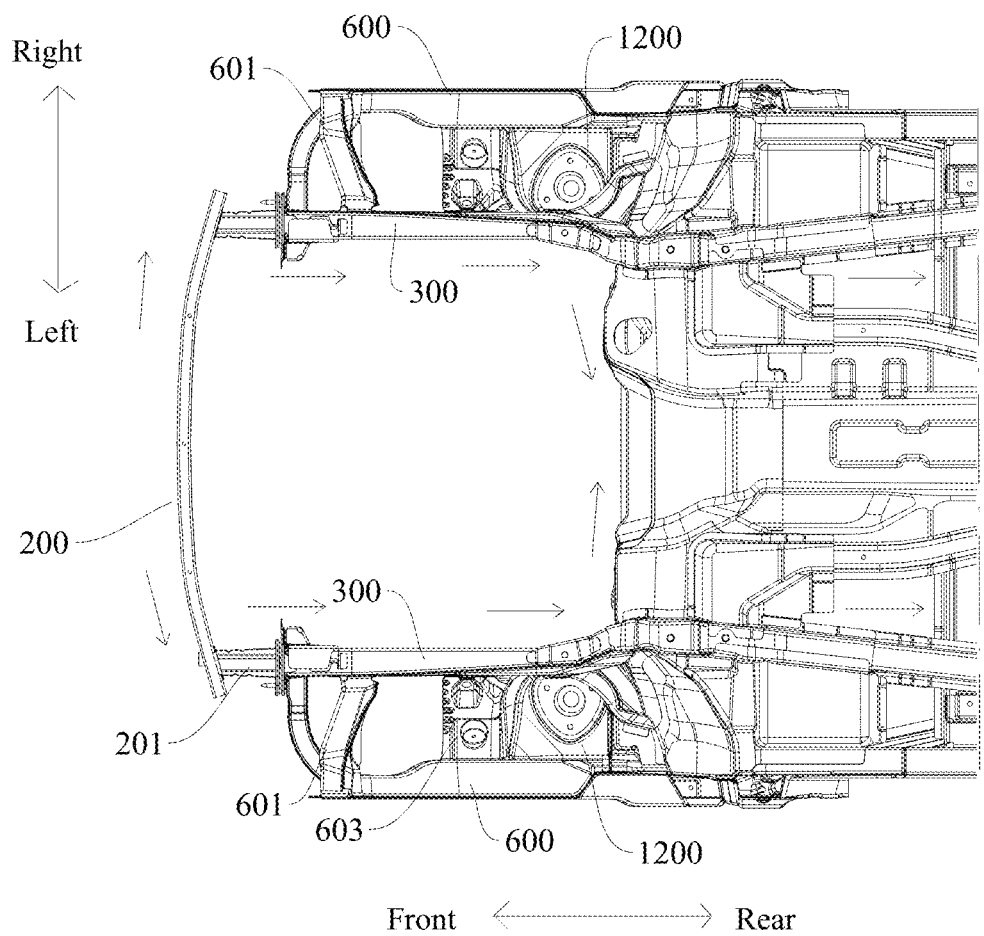

As illustrated in FIG. 1-3, the vehicle body 10000 can also include two upper side beams 600. A rear end of each of the upper side beams 600 is connected to the A-pillar 100 at the same side therewith, and a plurality of connecting parts are provided between each of the upper side beams 600 and the front longitudinal beam 300 at the same side therewith, such that the front longitudinal beam 300 is connected to the A-pillar 100 by means of a plurality of force transmission paths. Therefore, it should be understood that the front longitudinal beam 300 can be connected to the A-pillar 100 by means of the upper side beams 600. There are a plurality of methods of connection between the front longitudinal beam 300 and the upper side beam 600, each of which is embodied by different connecting parts, such that a plurality of force transmission paths is arranged between the front longitudinal beam 300 and the A-pillar 100. In other words, one connecting portion and the upper side beam 600 can form one force transmission path. In addition, the front longitudinal beam 300 can also be connected to the A-pillar by means of the dash panel 400, which also forms one force transmission path.

Hence, the upper side beam 600 can be fully utilized, and the upper side beam 600 can share the applied force on the front longitudinal beam 300. Moreover, by means of the plurality of connecting parts, the front compartment of the vehicle body 10000 can absorb and resolve the applied force efficiently and quickly, so as to significantly reduce the intrusive amount of the dash panel 400, thereby better ensuring the sufficient surviving space for the passenger compartment.

Specific layouts of a plurality of connecting parts are described in detail as follows.

The vehicle body 10000 includes a front longitudinal beam assembly which includes a front longitudinal beam 300, a first bracket 301, and an upper side beam 600.

According to an optional embodiment of the present disclosure, as illustrated in FIGS. 4-9, a plurality of connecting parts can include the first bracket 601 extends in a left-right direction, and an inner end of the first bracket 601 is connected to an outer side of the front longitudinal beam 300. Moreover, the inner end of the first bracket 601 is adjacent to a front end of front longitudinal beam 300, and a front lower end of the upper side beam 600 is connected to an outer end of the first bracket 601. In other words, the first bracket 601 is connected between the front longitudinal beam 300 and the front lower end of the upper side beam 600. Hence, when the vehicle is in frontal crash, the front longitudinal beam 300 can transmit force to the A-pillar 100 by means of the first bracket 601 and the upper side beam 600, and then to the floor and a side wall 1400, thus effectively dispersing the impact force. Moreover, in the above process, the upper side beam 600 can absorb and resolve the applied force. When the vehicle is in offset crash, the first bracket 601 contacts an obstacle and exerts the force on the front longitudinal beam 300 towards an outside in a width direction of the vehicle, which can guide the front longitudinal beam 300 to deform towards the outside in the width direction of the vehicle, thereby increasing the compression space of the engine compartment, and reducing the load on the dash panel 400. Moreover, the first bracket 601 of the arrangement can help to transmit and resolve the applied force.

The upper side beam 600 can absorb energy effectively, transmit the impact force to the A-pillar 100 and to the front longitudinal beam 300 by means of the first bracket 601, thereby dispersing the applied force effectively and improving the crash performance of the vehicle.

The first bracket 601 can be welded to the front longitudinal beam 300 and the upper side beam 600, the fixing method is simple and reliable, and the welding efficiency is high. The upper side beam 600 obliquely extends upward from the front to the rear. The upper side beam 600 of the arrangement matches a shape of the vehicle body 10000 and can transmit force better.

Figure 7:
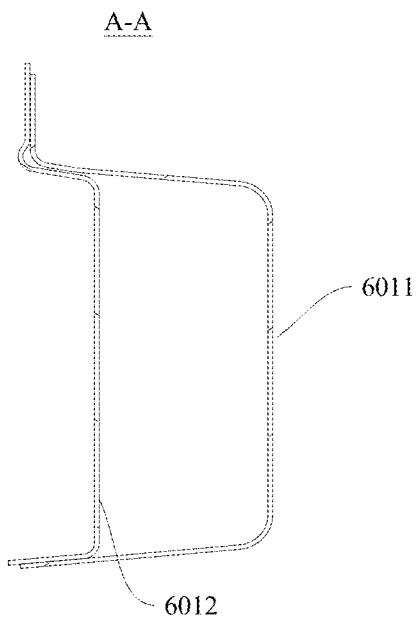
FIG. 7 is a sectional view along line A-A in FIG. 6.

Optionally, the first bracket 601 has a closed cross section, and the first bracket 601 of the arrangement has better structural reliability. When the vehicle is in offset crash, the first bracket 601 can transmit the applied force effectively, thereby improving the effect of the offset crash. Specifically, as illustrated in FIG. 7, the first bracket 601 includes a first bracket plate 6011 and a second bracket plate 6012. The first bracket plate 6011 is in the shape of U. The second bracket plate 6012 is fixed at an opening of the first bracket plate 6011 and seals the opening. Therefore, the first bracket 601 has a simple structure and a low manufacturing cost. In addition, the first bracket 601 can be formed as a closed structure in this way.

Figure 8:
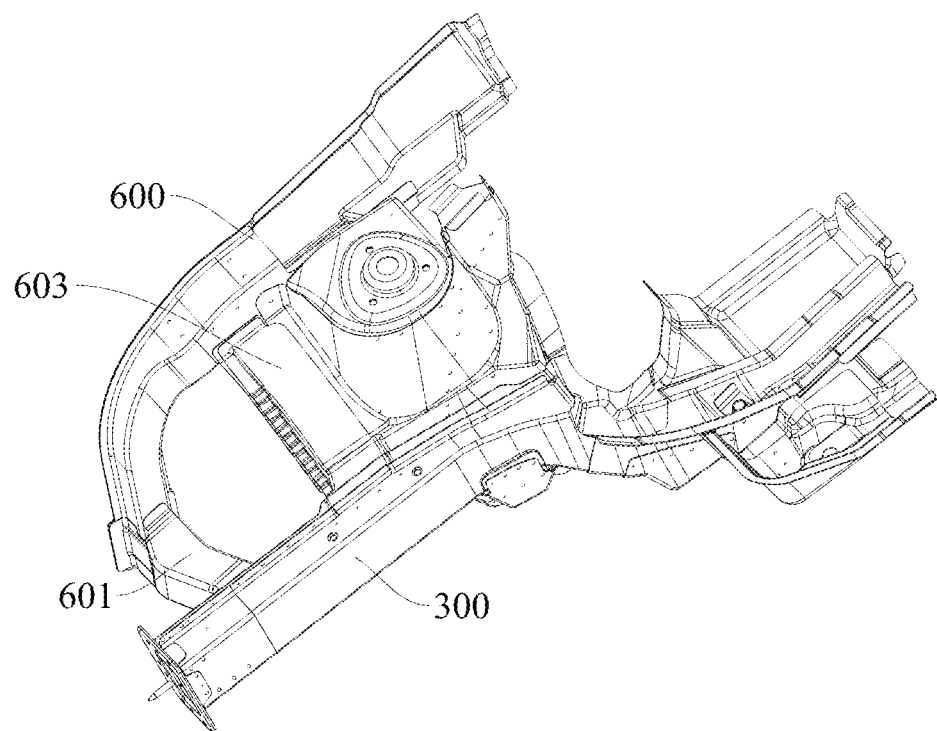
FIG. 8 is a perspective view of the cooperation between the front longitudinal beam and the upper side beam.
Figure 9:
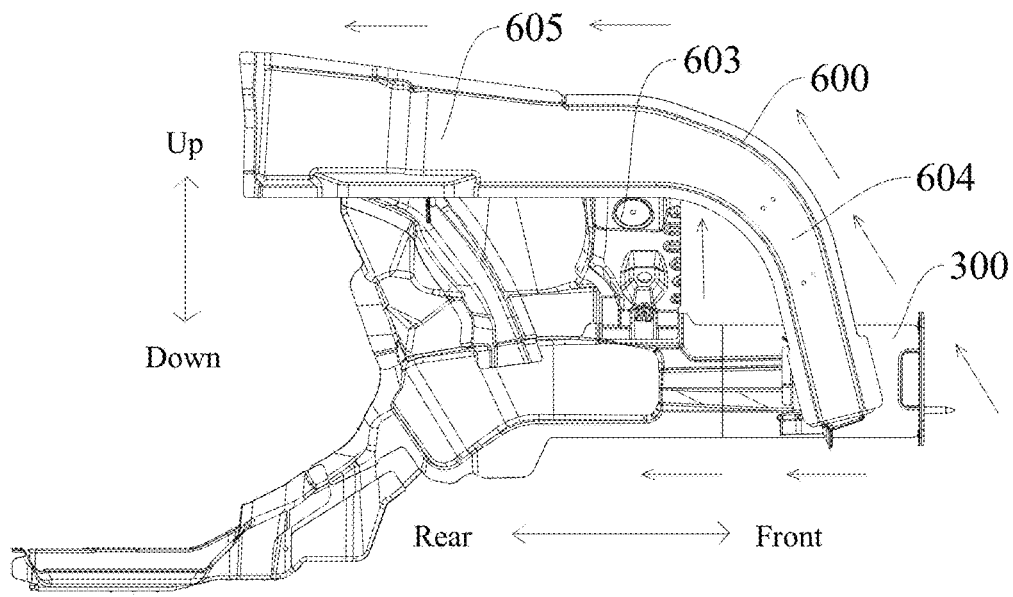
FIG. 9 is a side view of the cooperation between the front longitudinal beam and the upper side beam.

Optionally, as illustrated in FIG. 8, the first bracket plate 6011 and the second bracket plate 6012 are provided with side flanges fixed to the front longitudinal beam 300, respectively. The side flanges can be welded to an outer side wall of the front longitudinal beam 300, such that the first bracket 601 is fixed to the front longitudinal beam 300 reliably, which facilitates the transmission of the impact force when the offset crash occurs.

As illustrated in FIG. 8, the first bracket plate 6011 and the second bracket plate 6012 are provided with side flanges fixed to the upper side beam 600 respectively. That is, the first bracket 601 is also fixed to the upper side beam 600 by means of the side flanges, such that the first bracket 601 and the upper side beam 600 are fixed reliably, which facilitates the transmission of the impact force when the offset crash occurs.

Figure 21:
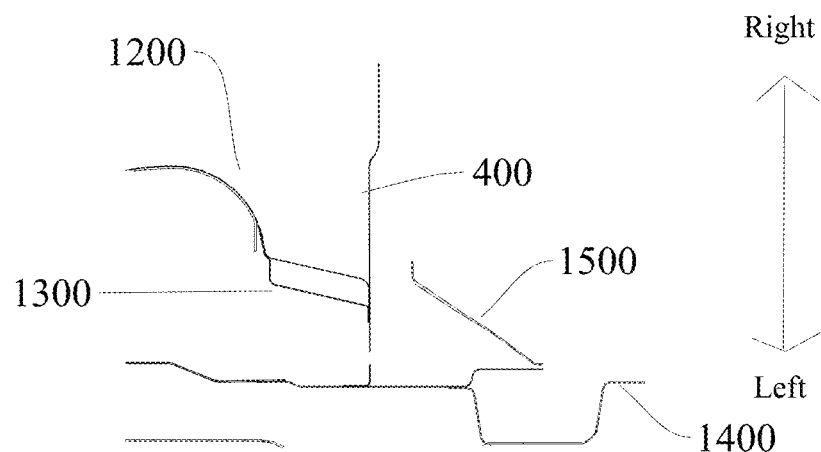
FIG. 21 is a sectional view along line G-G in FIG. 20.

Furthermore, as illustrated in FIGS. 13 and 21, a plurality of connecting parts can also include a second bracket 602 connected between the upper side beam 600 and the front longitudinal beam 300 at the same side therewith, and the connection between the second bracket 602 and the upper side beam 600 is arranged at an rear upper position relative to the connection between the first bracket 601 and the upper side beam 600. That is, on the basis of the first bracket 601, the second bracket 602 is also connected between the front longitudinal beam 300 and the upper side beam 600, and the second bracket 602 can also transmit the impact force. Thus, when the vehicle is in frontal crash, the front longitudinal beam 300 can transmit the impact force to the A-pillar 100 by means of the second bracket 602 and the upper side beam 600, thereby transmitting to the side wall 1400 and the floor in the rear by means of the A-pillar 100.

Specifically, as illustrated in FIG. 21, the second bracket 602 can include a first connecting piece 6021 and a second connecting piece 6022. The first connecting piece 6021 extends along the left-right direction and is connected between the upper side beam 600 and the second connecting piece 6022. The second connecting piece 6022 extends along an upper-lower direction, and a lower end of the second connecting piece 6022 is connected on the front longitudinal beam 300. The second bracket 602 of the arrangement is simple in structure and can reasonably connect the front longitudinal beam 300 with the upper side beam 600, which can improve the force transmission efficiency.

As illustrated in FIG. 21, the first connecting piece 6021 can be arc in shape, and the second connecting piece 6022 has a plate structure with a groove and an open front end, such that the first connecting piece 6021 can effectively connect the second connecting piece 6022 and the upper side beam 600 and reasonably, and adapts to the front compartment space of the vehicle body 10000. Moreover, the second connecting piece 6022 of the arrangement can facilitate the mounting of other components of the vehicle body 10000, thus improving the structural integrity of the vehicle body 10000 and further improving the structural reliability of the vehicle body 10000.

Figure 10:
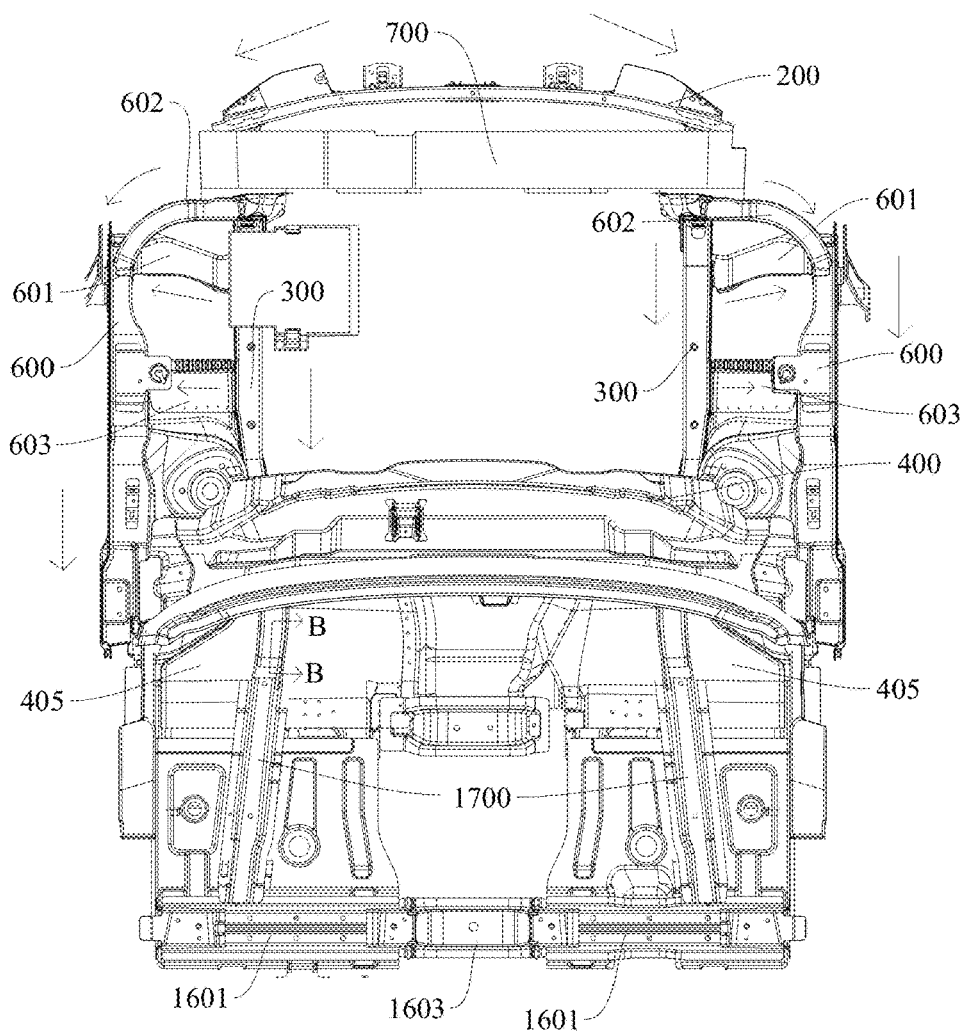
FIG. 10 is a partially top view of a vehicle body according to an embodiment of the present disclosure.
Figure 17:
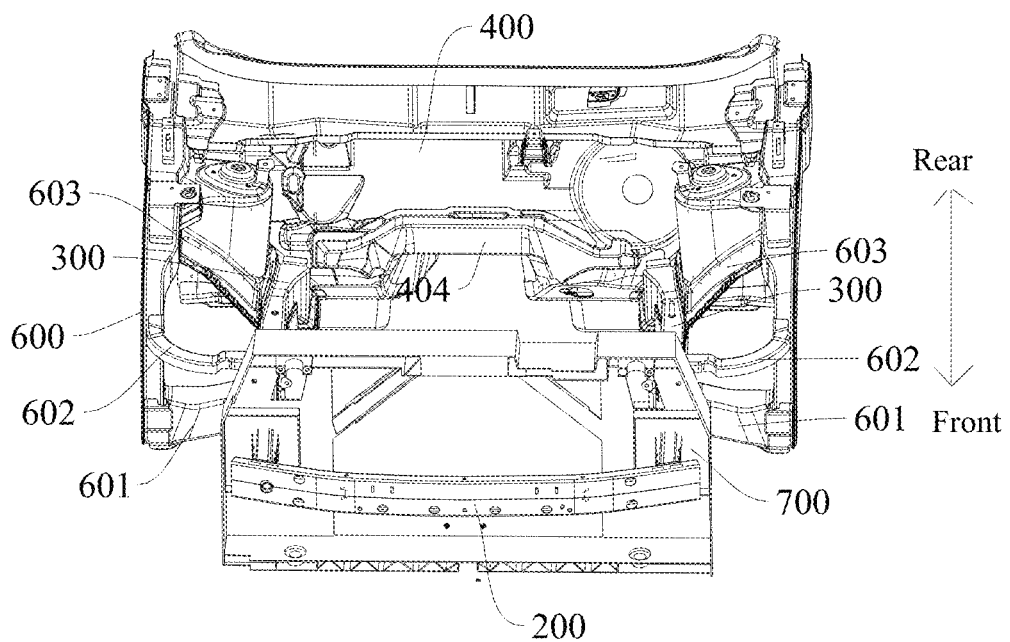
FIG. 17 is a perspective view of a front compartment of a vehicle body according to an embodiment of the present disclosure.

As illustrated in FIGS. 10 and 17, the vehicle body 10000 can also include a front end closing structure 700, which is connected on the front longitudinal beam 300 by means of the second connecting piece 6022. Due to the open front end of the second connecting piece 6022, the front end closing structure 700 can be conveniently mounted, and the mounting area of the front end closing structure 700 and the second connecting piece 6022 can be ensured, thereby further improving the mounting reliability of the front end closing structure 700. The front end closing structure 700 can integrally be rectangle in shape, and the front end closing structure 700 can enable the front compartment of the vehicle body 10000 to bear uniform force, therefore improving the force transmission efficiency.

The first bracket 601, the second bracket 602, a portion of the upper side beam 600 located between the first bracket 601 and the second bracket 602, and a portion of the front longitudinal beam 300 located between the first bracket 601 and the second bracket 602 form a three-dimensional quadrangle. The three-dimensional quadrangle is more stable and reliable, such that the structure of the front compartment of the vehicle body 10000 is more reliable and stable and the force transmission effect is better.

Furthermore, as illustrated in FIGS. 1 and 2, the plurality of connecting parts can include a third bracket 603, a third bracket 603, and the third bracket 603 is connected between the upper side beam 600 and the front longitudinal beam 300. The connection between the third bracket 603 and the upper side beam 600 is located at rear of the connection between the second bracket 602 and the upper side beam 600. That is, on the basis of the first bracket 601 and the second bracket 602, the third bracket 603 is also connected between the front longitudinal beam 300 and the upper side beam 600, and the third bracket 603 and the upper side beam 600 constitute one force transmission path. By means of the third bracket 603, the force transmission paths between the front longitudinal beam 300 and the A-pillar 100 can be better enriched, which enables the front compartment of the vehicle body 10000 to bear uniform force with good force transmission efficiency and high force transmission efficiency.

Optionally, as illustrated in FIGS. 1 and 2, the third bracket 603 can be an integrally formed plate structure. Therefore, the third bracket 603 has a simple and reliable structure and a low manufacturing cost.

Specifically, as illustrated in FIG. 2, the upper side beam 600 can include an arc segment 604 and a straight segment 605. The arc segment 604 is connected in front of the straight segment 605. The first bracket 601 and second bracket 602 are connected to the arc segment 604, and the third bracket 603 is connected on the straight segment 605 which is connected to the A-pillar 100 in rear. With an arc front segment 901 of the upper side beam 600, the force transmission is benefited, and the shape of which matches the front compartment of the vehicle body 10000 much more. In addition, with a straight rear segment 903 of the third bracket 603, the force on the arc segment 604 can be easily transmitted to the A-pillar 100, thereby enhancing the force transmission effect.

It should to be noted that the upper side beam 600 can be composed by two structures at front and rear. A front structure is provided with the arc segment 604 and a portion of the straight segment 605. A rear structure is integrally configured as the other portion of the straight segment 605. Thus, the connection between the front structure and the rear structure is reliable and smooth, so as to improve the structural reliability of the upper side beam 600.

Optionally, the width of the upper side beam 600 increases along an extending direction from the front to the rear, such that the upper side beam 600 has a light weight, thereby meeting a lightweight design requirement of the vehicle. Moreover, the connection between the rear end of the upper side beam 600 and the A-pillar 100 is more reliable.

Optionally, the projection of the upper side beam 600 on the horizontal plane is linear, and the upper side beam 600 leans inwards in a direction from the rear to the front. In other words, the upper side beam 600 leans outwards in a direction from the front to the rear, such that the structure of the upper side beam 600 is reliable. In case of deformation during a crash, the upper side beam 600 deforms towards the outer side of the vehicle body 10000, and the upper side beam 600 can also guide the front longitudinal beam 300 to deform outwards by means of the plurality of connecting parts, thus reducing the intrusive amount on the passenger compartment and providing safe surviving space for passengers.

The vehicle body 10000 also includes a wheelhouse 1200. The layout form of the wheelhouse 1200 is described in detail with reference to the drawings as follows.

Figure 20:
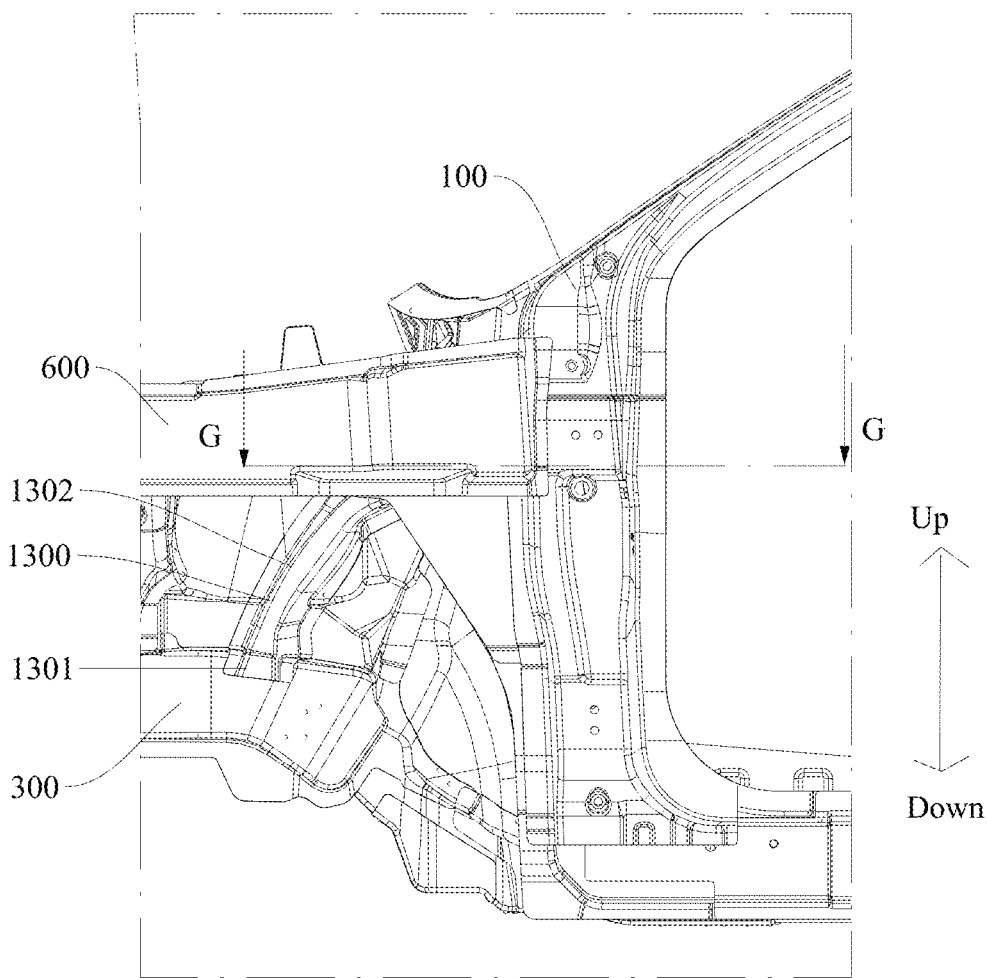
FIG. 20 is a schematic view of the cooperation among an upper side beam, an A-pillar and a rear wall.

As illustrated in FIGS. 1, 2 and 20, the wheelhouse 1200 is mounted above a rear portion of the front longitudinal beam 300, and the dash panel 400 is connected behind the wheelhouse 1200. In other words, the wheelhouse 1200 extends backwards and is connected to the dash panel 400. The wheelhouse 1200 is provided with a wheelhouse reinforcing member 1300. The wheelhouse reinforcing member 1300 is composed of a first part 1301 and a second part 1302. The first part 1301 is a front lower end of the wheelhouse reinforcing member 1300 which is connected to the rear portion of the front longitudinal beam 300. For example, the front lower end of the wheelhouse reinforcing member 1300 is welded to the rear portion of the front longitudinal beam 300, and the second part 1302 of the wheelhouse reinforcing member 1300 is integrally fixed on the wheelhouse 1200. Thus, the wheelhouse reinforcing member 1300 can effectively strengthen the wheelhouse 1200 and transmit the force. For example, the wheelhouse reinforcing member 1300 is capable of transmitting the impact force on the front longitudinal beam 300 to the wheelhouse 1200, and the wheelhouse 1200 can further transmit the impact force to the dash panel 400. The dash panel 400 can also further transmit the impact force to the side wall 1400 and the floor, thus effectively resolving the applied force and improving the crash performance of the vehicle.

Figure 18:
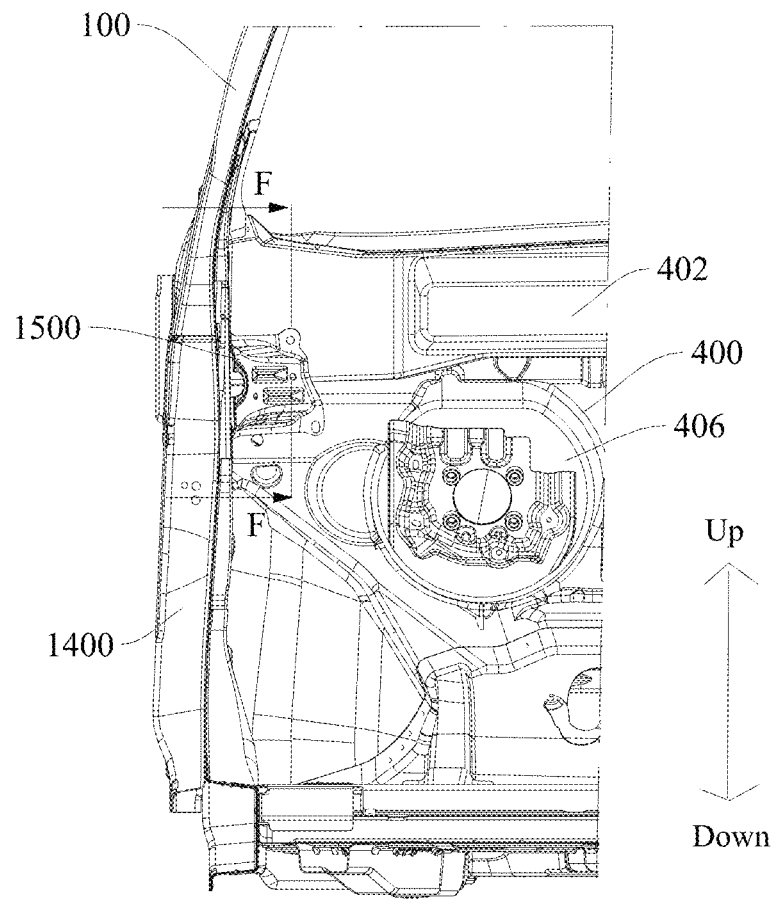
FIG. 18 is a partially schematic view of the cooperation between a dash panel and a side wall.
Figure 19:
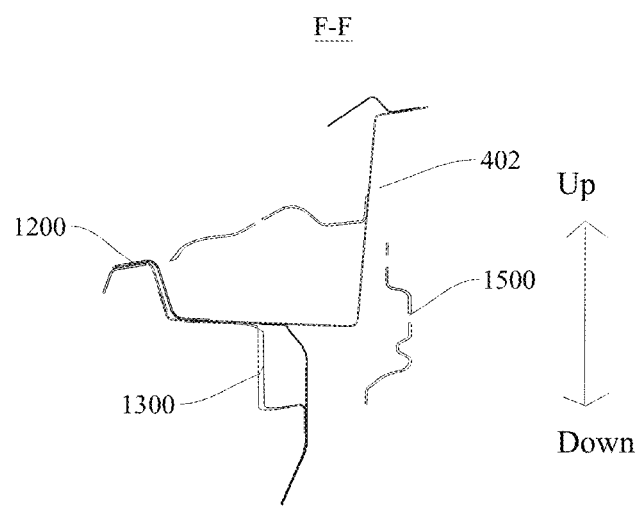
FIG. 19 is a sectional view along line F-F in FIG. 18.

As illustrated in FIGS. 18 and 19, the vehicle body 10000 can also include a connecting piece 1500 connected between the dash panel 400 and the side wall 1400. Lower portions of the connecting piece 1500 are spaced by the dash panel 400 and correspond to front and rear portion of the wheelhouse reinforcing member 1300 in the left-right direction and in the upper-lower direction. Thus, the impact force transmitted to the wheelhouse reinforcing member 1300 can be transmitted to the side wall 1400 by means of the dash panel 400 and the connecting piece 1500, which further effectively resolves the applied force, thereby improving the crash performance of the vehicle. In addition, with the arrangement of the connecting piece 1500, the rigidity and strength of the vehicle body 10000 are improved, so as to restrain the deformation of the passenger compartment and ensure the surviving space for passengers.

The wheelhouse reinforcing member 1300 can be arranged on an outer side of the wheelhouse 1200. Thus, it is convenient to make the wheelhouse reinforcing member 1300 correspond to the connecting piece 1500, thereby improving the structural reliability of the vehicle body 10000.

Optionally, as illustrated in FIG. 21, the second part 1302 of the wheelhouse reinforcing member 1300 extends to the connection between the wheelhouse 1200 and the dash panel 400. The wheelhouse reinforcing member 1300 of the arrangement can effectively strengthen the wheelhouse 1200 and can also effectively transmit the impact force when the vehicle is in frontal crash, which can improve the force transmission effect.

Optionally, as illustrated in FIG. 20, the wheelhouse reinforcing member 1300 is arc in shape, and the arc wheelhouse reinforcing member 1300 can match the wheelhouse 1200 and windingly extend from the front to the rear. In addition, the structure of the arc wheelhouse reinforcing member 1300 is simple and reliable.

As illustrated in FIG. 18, a triangular closed-loop connecting structure is formed among the dash panel 400, the side wall 1400 and the connecting piece 1500. Hence, the connection between the dash panel 400 and the side wall 1400 is reliable, and the force can be transmitted by means of the connecting piece 1500. The arrangement of the triangular closed-loop connecting structure can enrich the force transmission path, improve the force transmission effect, and further enhance the crash performance of the vehicle.

Furthermore, as illustrated in FIG. 18, the upper portion of the connecting piece 1500 can also be fixed to the dash upper cross member 402. It should be understood that, in the upper-lower direction, the connecting piece 1500 has an upper portion and a lower portion. The upper portion is used to be connected to the dash upper cross member 402 and the lower portion is used to be connected to the dash panel 400, which can further improve the reliability of the connection between the side wall 1400 and the dash panel 400 and can enrich the force transmission path, thereby improving the crash performance of the vehicle.

Specifically, the connecting piece 1500 is welded to the dash upper cross member 402 and the dash panel 400. The welded fixing can not only improve the fixed reliability of connecting piece 1500, but also improve the manufacturing efficiency of the vehicle body 10000.

Figure 16:
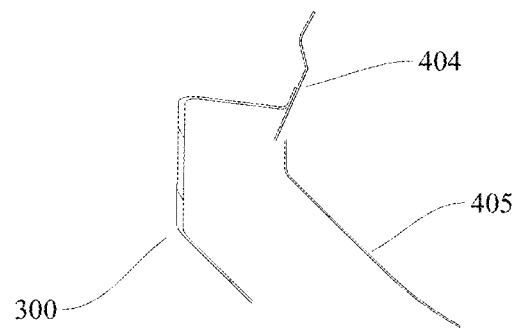
FIG. 16 is a sectional view along line D-D in FIG. 15.

As illustrated in FIGS. 16 and 17, the vehicle body 10000 also includes a dash middle cross member 404 arranged on a front surface of the dash panel 400. Two ends of the dash middle cross member 404 are connected to the rear ends of the two front longitudinal beams 300 respectively to form a closed-loop force transmission structure together with the front impact beam 200 and the two front longitudinal beams 300. The closed-loop force transmission structure is closed-loop in structure and can transmit the force. For example, when the vehicle is in frontal crash, the front impact beam 200 can transmit the impact force to the two front longitudinal beams 300 in the rear. Since both the rear ends of the two front longitudinal beams 300 are connected to the dash middle cross member 404, the impact force can be transmitted to the dash middle cross member 404. The dash middle cross member 404 of the arrangement can effectively enrich the force transmission path and disperse the applied force, thus restraining the deformation of passenger compartment and providing surviving space for passengers.

It should be noted that the force transmission between the dash middle cross member 404 and the front longitudinal beam 300 does not conflict with other force transmission paths. For example, the front longitudinal beam 300 can still transmit the impact force to the front floor longitudinal beam 500, the rocker panel 800 and other structures. The arrangement of the dash middle cross member 404 can enhance the structural strength of the vehicle body 10000 and enrich the force transmission path.

The dash upper panel 406 is also provided with a dash upper-panel reinforcing plate. The cross segments of the dash upper-panel reinforcing plate and the dash upper panel 406 are F in shape. The dash upper panel 406 is arranged above the dash middle cross member 404, and the two ends of the dash upper panel 406 can be connected to damper bases at two sides respectively. Thus, the dash upper panel 406 can effectively strengthen the structural strength of the dash panel 400 and enhance the integrity of the front compartment of the vehicle body 10000, thereby further improving the structural reliability of the vehicle body 10000.

Optionally, as illustrated in FIGS. 1 and 19, two ends of the dash middle cross member 404 obliquely extend downwards to be connected to the rear ends of the front longitudinal beams 300. The dash middle cross member 404 can include a left segment, a middle segment and a right segment. The middle segment is connected between the left segment and the right segment. The middle segment generally extends horizontally in the left-right direction. The left segment obliquely extends. The left segment has a left lower end connected to the rear end of the front longitudinal beam 300 at the left side and a right upper end connected to the middle segment. The right segment has a right lower end connected to the rear end of the front longitudinal beam 300 at the right side and a left upper end connected to the middle segment. The dash middle cross member 404 of the arrangement can reasonably strengthen the dash panel 400 structure and be effectively connected to the front longitudinal beams 300 at two sides.

Optionally, as illustrated in FIG. 1, the rear end of the front longitudinal beam 300 obliquely extends inwards to be connected to an end portion of the dash middle cross member 404. The front longitudinal beam 300 of the arrangement can be effectively connected to the end portion of the dash middle cross member 404, and when the vehicle is in frontal crash, the front longitudinal beam 300 can deform outwards, thereby reducing the intrusive amount of the dash panel 400 and providing surviving space for passengers.

Specifically, the rear portion of the front longitudinal beam 300 curvedly extends upwards in the direction from the front to the rear, which can enhance the structural strength of the front longitudinal beam 300 and guide the rear portion of the front longitudinal beam 300 to deform upwards when the vehicle is in frontal crash, thus reducing the intrusive amount of the dash panel 400.

Furthermore, the rear portion of the front longitudinal beam 300 extends outwards in the direction from the front to the rear. The rear portion of the front longitudinal beam 300 extending outwards can guide the rear portion of the front longitudinal beam 300 to deform outwards when the vehicle is in frontal crash, thus reducing the intrusive amount of the dash panel 400.

It should be noted that the portion extending upwards on the front longitudinal beam 300 and the portion extending outwards on the front longitudinal beam 300 can be the same portion herein.

Optionally, the width of the dash middle cross member 404 reduces gradually from the midpoint to the two sides thereof. Thus, the strength of the dash middle cross member 404 is distributed appropriately in the left-right direction in general, which can improve the structural reliability of the dash middle cross member 404.

The layout form of the seat crossbeam of the vehicle body 10000 is described in detail as follows in combination with FIGS. 15 and 22.

Figure 22:
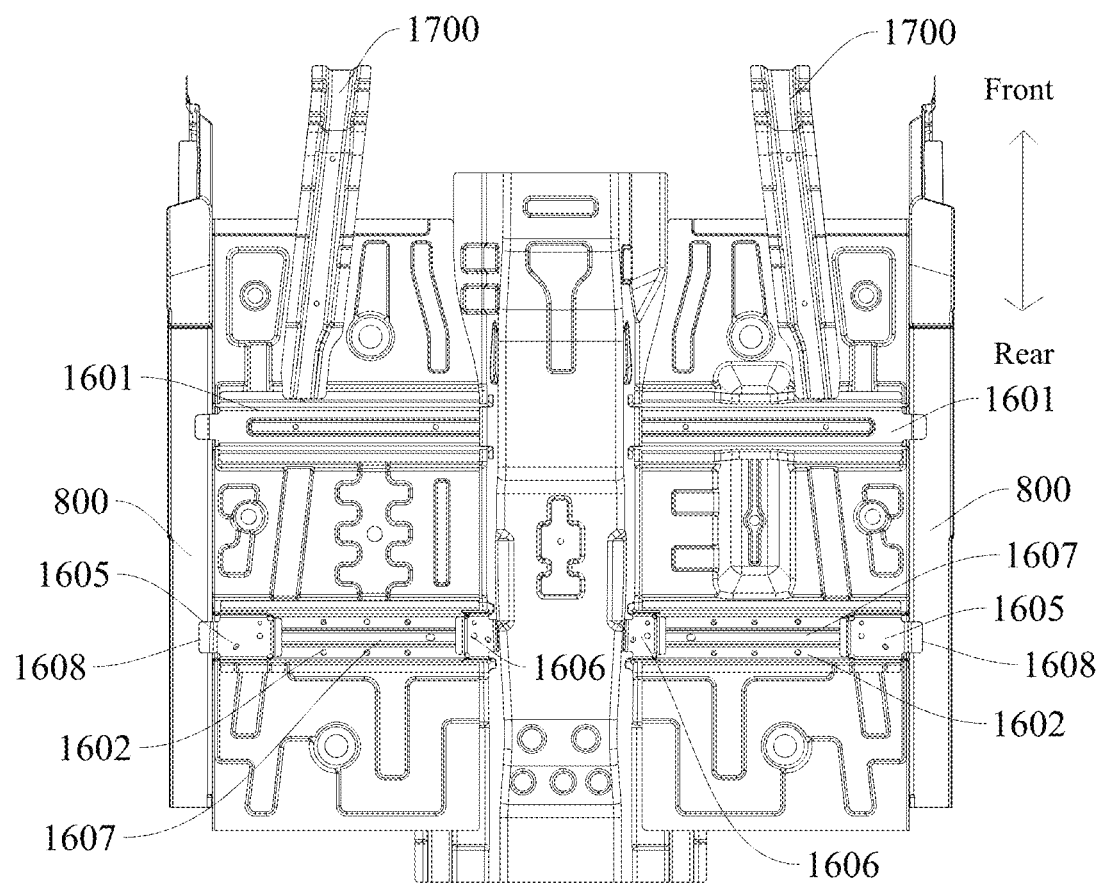
FIG. 22 is a top view of a floor in a vehicle body according to an embodiment of the present disclosure.

As illustrated in FIG. 22, the vehicle body 10000 can include a floor, and the floor can include two seat front cross members 1601, two seat rear cross members 1602, a seat front connecting plate 1603, a seat rear connecting plate, two rocker panels 800, two outer connecting plates 1605, and two inner connecting plates 1606. The two seat front cross members 1601 are spaced apart in the left-right direction, and the two seat front cross members 1601 are connected to each other by means of the seat front connecting plate 1603. Outer ends of the two seat front cross members 1601 are connected on the two rocker panels 800. The two seat rear cross members 1602 are spaced apart in the left-right direction. An outer end of each of the seat rear cross members 1602 is connected on the rocker panel 800 by means of the outer connecting plate 1605, and an inner end of each of the seat rear cross members 1602 is connected on the seat rear connecting plate by means of the inner connecting plate 1606. The two outer connecting plates 1605 and the two inner connecting plates 1606 are provided with seat mounting points respectively. Thus, a coherent structure can be formed among the seat front cross members 1601, the seat rear cross members 1602, and the two rocker panels 800, which can ensure the mounting function and mounting strength of the front seat, thereby improving the torsion resistance and rigidity of the front floor and improving the side crash performance of the vehicle.

Optionally, top walls of the two seat front cross members 1601 and the two seat rear cross members 1602 are provided with reinforcing ribs 1607 respectively, and the reinforcing ribs extend along the left-right direction. The reinforcing ribs 1607 can effectively enhance the structural strength of the corresponding seat front cross members 1601 and the seat rear cross members 1602, such that the seat front cross members 1601 and the seat rear cross members 1602 cannot protrude upwards when the vehicle is in side crash, thus reducing the intrusive amount into the passenger compartment and improving passenger safety. Specifically, the reinforcing ribs 1607 can be concave ribs or convex ribs. The structure of the concave ribs or the convex ribs is simple, thus reducing the manufacturing difficulty of the seat front cross members 1601 and the seat rear cross members 1602, and then reducing the manufacturing difficulty of the vehicle body 10000.

Optionally, the height of the seat front cross member 1601 is higher than that of the seat rear cross member 1602. Since the seat mounting points are arranged on the outer connecting plate 1605 and the inner connecting plate 1606, it is unnecessary to set the same height for the seat rear cross member 1602 and the seat front cross member 1601. Thus, the height of the seat rear cross member 1602 is lower, thereby reducing the weight of the seat rear cross member 1602 and further reducing the weight of the vehicle body 10000. In addition, the ½ height of the seat front cross member 1601 can be higher than the height of the seat rear cross member 1602. The seat rear cross member 1602 of the arrangement can not only facilitate the mounting of the outer connecting plate 1605 and the inner connecting plate 1606, but also better reduce the weight of the vehicle body 10000.

Specifically, the outer connecting plate 1605 and the inner connecting plate 1606 are reversed-U in shape, and lower edges of the outer connecting plate 1605 and the inner connecting plate 1606 are fixed on a side wall of the seat rear cross member 1602. The fixation can be achieved by welding, such that the outer connecting plate 1605 and the inner connecting plate 1606 are simple in structure, and the outer connecting plate 1605 and the inner connecting plate 1606 are reliably fixed to the seat rear cross member 1602.

Optionally, as illustrated in FIG. 22, the outer connecting plate 1605 can include a lapping edge 1608 lapped on a top wall of the rocker panel 800. The lapping edge 1608 can increase the contact area between the outer connecting plate 1605 and the rocker panel 800, which can further improve the connection reliability between the outer connecting plate 1605 and the rocker panel 800.

Optionally, the inner connecting plate 1606 can include a side flange lapped on a side wall of the seat rear connecting plate. The side flange can also increase the contact area, which can make the fixation between the inner connecting plate 1606 and the seat rear connecting plate more reliable.

A floor upper longitudinal beam 1700 of the vehicle body 10000 is described in detail with reference to FIG. 22 as follows.

Figure 11:
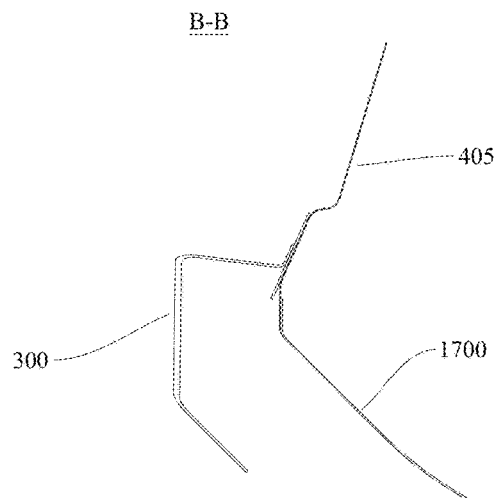
FIG. 11 is a sectional view along line B-B in FIG. 10.

The vehicle body 10000 can include the floor upper longitudinal beam 1700 arranged above the floor, and the dash lower panel 405 is connected to the front of the floor. The floor upper longitudinal beam 1700 obliquely extends on the dash lower panel 405 and the floor. A traditional floor upper longitudinal beam only extends on the floor, while the floor upper longitudinal beam 1700 of the present disclosure extends forwards to the floor, thereby effectively improving reliability of the connection between the floor and the dash lower panel 405. Moreover, the floor upper longitudinal beam 1700 can also transmit the force, so as to effectively resolve the applied force and improve the crash performance of the vehicle. As illustrated in FIG. 11, the floor upper longitudinal beam 1700 is arranged opposite to the rear end of the front longitudinal beam 300 in the front-rear direction and spaced apart from the front longitudinal beam 300 by the dash lower panel 405.

Figure 15:
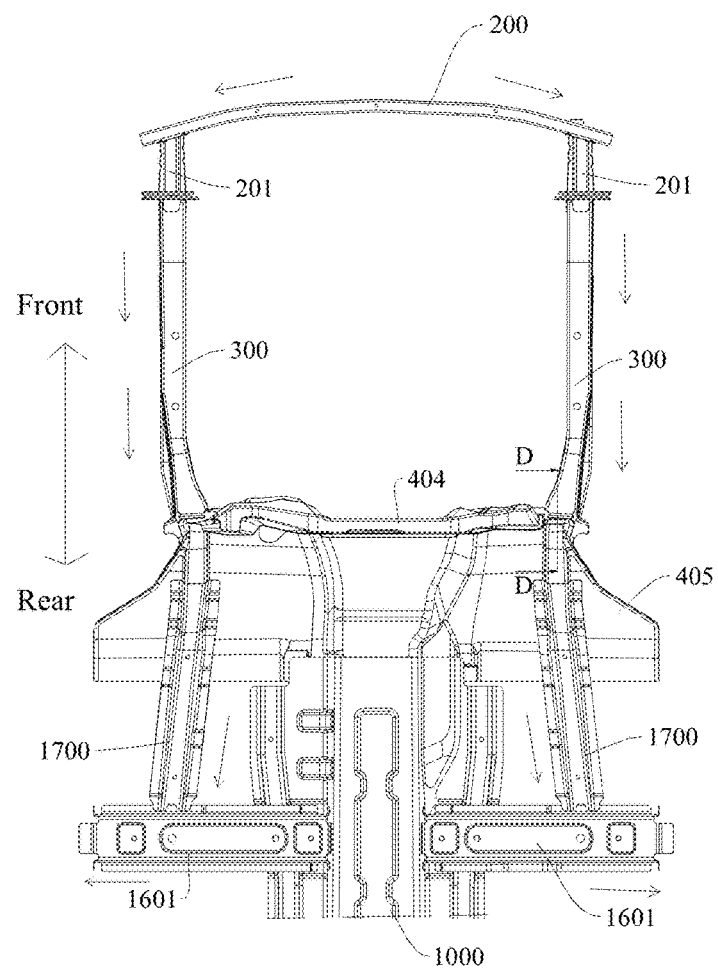
FIG. 15 is a partially top view of a vehicle body according to an embodiment of the present disclosure.

Specifically, as illustrated in FIGS. 15 and 21, the floor upper longitudinal beam 1700 obliquely extends from the inside to the outside along the direction from the front to the rear. The floor upper longitudinal beam 1700 can effectively restrain deformation of the floor when the vehicle is in frontal crash and in side crash, thereby improving the crash performance of the vehicle. Moreover, the floor upper longitudinal beam 1700 of the arrangement can facilitate the connection with the components in front of it.

Optionally, a rear side of the dash lower panel 405 is provided with a dash lower panel reinforcing rib extending in the left-right direction. There are two floor upper longitudinal beams 1700. The dash lower panel reinforcing rib is connected to two upper longitudinal beams 1700, and rear ends of the two floor upper longitudinal beams 1700 are connected to the seat front cross members 1601 at two sides respectively. Therefore, a closed-loop structure for force transmission is formed by the dash lower panel reinforcing rib, two floor upper longitudinal beams 1700, two seat front crossbeams 1601 and the seat front connecting plate 1603. Thus, when the vehicle is in frontal crash, the impact force can be transmitted from the dash lower panel reinforcing rib on the dash panel 400 to the seat front cross members 1601 by means of the floor upper longitudinal beams 1700, such that the applied force can be effectively resolved, and the force transmission effect can be improved, thereby further improving the crash performance of the vehicle.

The seat front cross members 1601 are also connected to the floor centre aisle 1000. Specifically, the seat front connecting plate 1603 is arranged below the floor centre aisle 1000, and the seat front connecting plates 1603 are connected between the two seat front cross members 1601.

The front side of the dash lower panel 405 is provided with the dash middle cross member 404, and the dash middle cross member 404 corresponds to the dash lower panel reinforcing rib in the front-rear direction. Moreover, the dash middle cross member 404 and the dash lower panel reinforcing rib at least partly overlap in the left-right direction and in the upper-lower direction. Therefore, the arrangement of the dash middle cross member 404 and the dash lower panel reinforcing rib can effectively strengthen the structural strength of the dash panel 400, thereby restraining the intrusive amount of the dash panel 400 and providing the surviving space for passengers. In addition, when the impact force is transmitted, the impact force transmitted to the dash middle cross member 404 can be transmitted to the dash lower panel reinforcing rib and the floor upper longitudinal beams 1700, which can effectively enrich the force transmission path and improve the crash performance of the vehicle.

Optionally, as illustrated in FIG. 15, the floor upper longitudinal beams 1700 are linear. The linear floor upper longitudinal beams 1700 are simple and reliable in structure and easy to manufacture.

The layout form of the rear floor longitudinal beam 900 is described in detail as follows.

Figure 14:
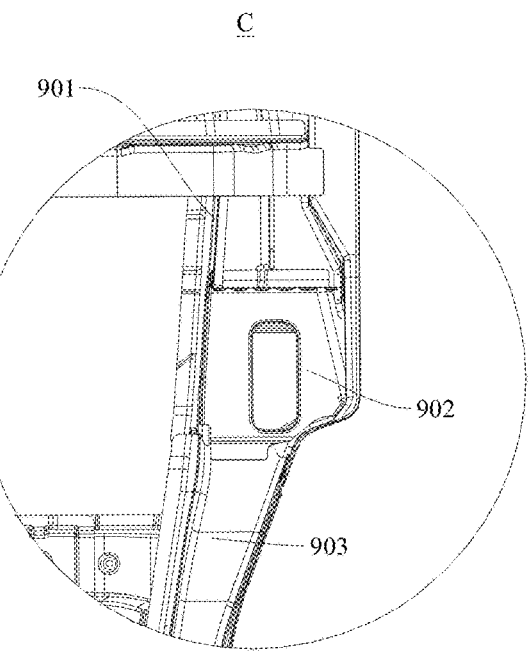
FIG. 14 is an enlarged view of area C in FIG. 13.

As illustrated in FIGS. 13 and 14, the rear floor longitudinal beam 900 includes a front segment 901, a middle segment 902, and a rear segment 903. The front segment 901 is connected to the rear end of the front floor longitudinal beam 500. The middle segment 902 is connected to the rear end of rocker panel 800, and the rear segment 903 extends backwards from the middle segment 902 to a rear subframe. Thus, the rear floor longitudinal beam 900 can effectively connect the rocker panel 800 with the front floor longitudinal beam 500, and the rear floor longitudinal beam 900 can also be connected to the subframe, such that the rear floor longitudinal beam 900 can transmit the impact force transmitted from the rocker panel 800 and the front floor longitudinal beam 500 to the subframe, which can effectively transmit the impact force and improve the crash performance of the vehicle.

Specifically, as illustrated in FIG. 14, a width of the middle segment 902 is larger than that of the front segment 901, and an outer wall of the middle segment 902 abuts an inner wall of the rocker panel 800 and is fixed thereto. Thus, a portion of the middle segment 902 can extend outwards, such that the middle segment 902 can be connected to the rear end of the rocker panel 800 on the outer side, thus enabling the rear floor longitudinal beam 900 and the rocker panel 800 to be fixed reliably.

As illustrated in FIG. 13, the vehicle body 10000 can also include the floor centre aisle 1000 and a rear floor cross member 1100, and the floor centre aisle 1000 is connected between the rear end of the front longitudinal beam 300 and the rear floor cross member 1100. The rear floor cross member 1100 is also connected to the rear floor longitudinal beams 900 to form a closed-loop force transmission structure with the floor centre aisle 1000, the front floor longitudinal beams 500 and the rear floor longitudinal beams 900. Therefore, it should be understood that, the front longitudinal beam 300 can not only transmit the impact force to the rocker panel 800 and the front floor longitudinal beam 500, but also transmit the impact force to the floor centre aisle 1000. The floor centre aisle 1000 can transmit the impact force to the rear floor longitudinal beams 900 by means of the rear floor cross member 1100, which can enrich the transmission path of floor impact force better, so as to effectively disperse the impact force and improve the crash performance of the vehicle.

Specifically, a centre aisle force transmission path 1001 extending along the front-rear direction is formed on the floor centre aisle 1000. The centre aisle force transmission path 1001 enables the impact force to be transmitted directly in the front-rear direction, thereby further improving the force transmission effect of the floor centre aisle 1000, so as to improve the force transmission efficiency. For example, the centre aisle force transmission path 1001 can be a groove. The centre aisle force transmission path 1001 of the arrangement is reliable for transmitting force and simple.

It should be noted that, one centre aisle force transmission path 1001 is arranged on each of a left side and a right side of the floor centre aisle 1000. The centre aisle force transmission path 1001 at the left side corresponds to the front floor longitudinal beam 500 at the left side, and the centre aisle force transmission path 1001 at the right side corresponds to the front floor longitudinal beam 500 at the right side.

As illustrated in FIG. 12, the vehicle body 10000 can also include a centre aisle connecting plate 1002 connected between the front floor longitudinal beam 500 and the floor centre aisle 1000. The centre aisle connecting plate 1002, the rear portion of the front longitudinal beam 300, and the front floor longitudinal beam 500 form a Y-shaped force transmission structure. Thus, the force transmission efficiency is high and the force transmission is dispersed, such that the crash performance of the vehicle can be improved.

Furthermore, a front torsion box 801 is connected between the rocker panel 800 and the rear portion of the front longitudinal beam 300, and the centre aisle connecting plate 1002 is connected between the floor centre aisle 1000 and the rear portion of the front longitudinal beam 300. The front torsion box 801, the front floor longitudinal beam 500, and the centre aisle connecting plate 1002 form a trifurcated structure. Thus, the front longitudinal beam 300 can transmit force backwards in three directions, which can improve the force transmission effect and the crash performance of the vehicle.

Figure 23:
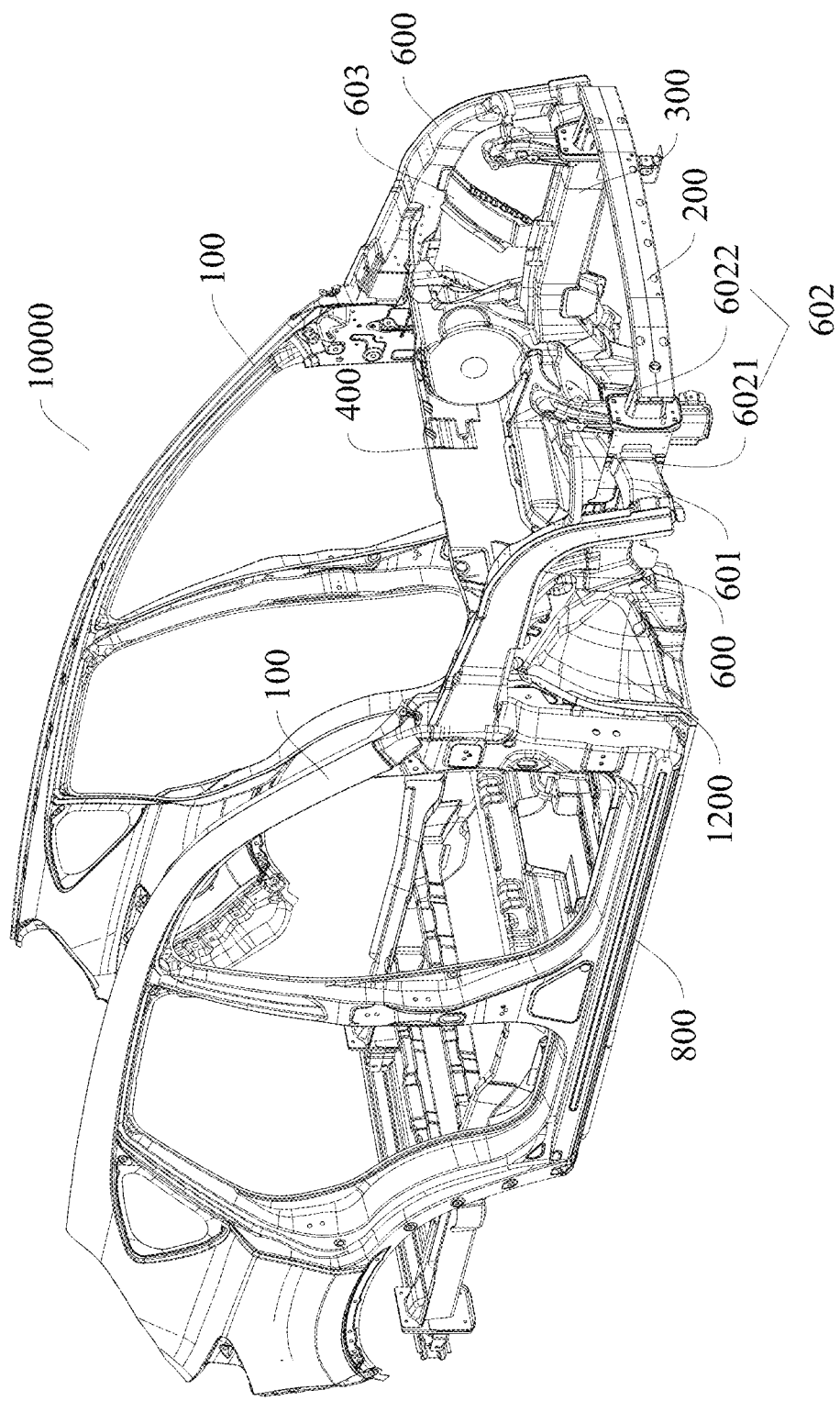
FIG. 23 is a perspective view of a vehicle body according to an embodiment of the present disclosure.

The transmission process of the impact force is described in detail in the following, when the vehicle body 10000 according to embodiments of the present disclosure is in frontal crash, taking the vehicle body 10000 illustrated in FIG. 23 as an example Firstly, the specific structure of the vehicle body 10000 illustrated in FIG. 23 is described. The vehicle body 10000 includes a front impact beam 200, a energy absorber 201, a front longitudinal beam 300, a front end closing structure 700, an upper side beam 600, a plurality of connecting parts, an A-pillar 100, a side wall 1400, a dash panel 400, a dash middle cross member 404, a wheelhouse 1200, a wheelhouse reinforcing member 1300, a connecting piece 1500, an dash upper cross member 402, a dash lower vertical member 403, a dash centre aisle 401, a dash lower panel reinforcing rib, a floor, a floor centre aisle 1000, a centre aisle connecting plate 1002, a front torsion box 801, a floor upper longitudinal beam 1700, a rocker panel 800, a front floor longitudinal beam 500, a rear floor longitudinal beam 900, a rear floor cross member 1100, a subframe, a seat front cross member 1601, a seat rear cross member 1602, and other components. The number of the above components is no longer described and those skilled in the art can clearly confirm the number according to the above context and the drawings. For example, two front longitudinal beams 300 are symmetrically arranged at the left and the right, and two upper side beams 600 are symmetrically arranged at the left and the right.

When the vehicle is in frontal crash, the impact force generated during the crash is directly transmitted to the front impact beam 200. The energy absorbers 201 at both sides of the front impact beam 200 absorb the energy and then transmit the impact force to the front longitudinal beams 300 at the rear. Each front impact beam 200 has a plurality of transmission paths to the A-pillar 100, and the A-pillar 100 is connected to the dash panel 400 and the side wall 1400, such that the force can be effectively solved.

The impact force transmitted backwards from the front longitudinal beam 300 can also be roughly resolved into two directions, one is the direction of the dash panel 400 and the side wall 1400, and the other one is the direction of the floor.

Starting from the direction of the dash panel 400 and the side wall 1400, the front longitudinal beam 300 can transmit a part of the impact force to the upper side beam 600 by means of the first bracket 601, and the upper side beam 600 can transmit the part of the impact force to the A-pillar 100, which can enrich the transmission path of the impact force, reduce the load of the front longitudinal beam 300, and improve the crash performance of the vehicle.

The front longitudinal beam 300 can transmit another part of the impact force to the upper side beam 600 by means of the second bracket 602, and the upper side beam 600 can transmit this part of the impact force to the A-pillar 100, which can enrich the transmission path of the impact force, reduce the load of the front longitudinal beam 300, and improve the crash performance of the vehicle.

It should be noted that the second bracket 602 includes a first connecting piece 6021 and a second connecting piece 6022. The second connecting piece 6022 is used to connect the front end closing structure 700, such that the front longitudinal beam 300 can transmit a part of the impact force to the second bracket 602 by means of the front end closing structure 700, and the second bracket 602 transmits the impact force again to the upper side beam 600. The front end closing structure can make the impact force transmitted uniformly, thereby improving the force transmission effect.

The front longitudinal beam 300 can also transmit another part of the impact force to the upper side beam 600 by means of a third bracket 603, and the upper side beam 600 can transmit this part of the impact force to the A-pillar 100, which can enrich the transmission path of the impact force, reduce the load of the front longitudinal beam 300, and improve the crash performance of the vehicle.

The first bracket 601, the second bracket 602, and the third bracket 603 are a plurality of connecting parts of the vehicle body 10000. The plurality of connecting parts of such arrangement can increase the force transmission path between the front longitudinal beam 300 and the upper side beam 600, which can better disperse the applied force. Moreover, there is no conflict among the force transmission processes by means of the first bracket 601, the second bracket 602, and the third bracket 603, the force transmission processes can even complement each other. The first bracket 601, the second bracket 602, and the third bracket 603 can dispersedly transmit the impact force on different positions of the front longitudinal beam 300 to the upper side beam 600, thereby better improving the force transmission effect.

In addition, the wheelhouse 1200 is connected between a rear portion of the front longitudinal beam 300 and the dash panel 400, and the wheelhouse reinforcing member 1300 is mounted on the wheelhouse 1200. A front lower portion of the wheelhouse reinforcing member 1300 is connected on the rear portion of the front longitudinal beam 300 and then integrally connected to the wheelhouse 1200, such that the front longitudinal beam 300 can also transmit a part of the impact force to the wheelhouse reinforcing member 1300, and the wheelhouse reinforcing member 1300 can transmit the impact force to the dash panel 400 by means of the wheelhouse 1200. The dash panel 400 continues to transmit backwards. Therefore, the wheelhouse reinforcing member 1300 can effectively enrich the transmission path, effectively resolve the impact force, and improve the crash performance of the vehicle.

A rear portion of the dash panel 400 corresponding to the wheelhouse reinforcing member 1300 is provided with the connecting piece 1500. The connecting piece 1500 can effectively connect the dash panel 400 and the side wall 1400, and the connecting piece 1500 is also connected to the dash upper cross member 402. So after that the wheelhouse reinforcing member 1300 transmits the impact force to the dash panel 400, the impact force can be transmitted on the dash middle cross member 404 on the dash panel 400 and also transmitted backwards to the side wall 1400 by means of the connecting piece 1500, which can further disperse the impact force, improve the force transmission efficiency, and improve the crash performance of the vehicle.

Certainly, since a rear end of the upper side beam 600 is directly connected to the A-pillar 100, the impact force transmitted from the upper side beam 600 to the A-pillar 100 can be transmitted to the dash panel 400 and the side wall 1400, such that the impact force can be further dispersed and the force transmission effect can be improved.

The impact force transmitted to the dash panel 400 can be transmitted from both ends of the dash upper cross member 402 to the midpoint thereof, and the impact force transmitted to the midpoint can be transmitted downwards by means of the dash lower vertical member 403. The dash centre aisle 401 is connected to the floor centre aisle 1000, such that the impact force on the dash panel 400 can be directly transmitted to the floor. Other forms of force transmission between the dash panel 400 and the floor are described in detail later.

The impact force on the side wall 1400 can be directly transmitted backwards. The impact force on the side wall 1400 can also be transmitted to the rocker panel 800, and the rocker panel 800 transmits backwards.

In addition, the rear end of the front longitudinal beam 300 is connected to the dash panel 400, and rear ends of the two front longitudinal beams 300 are also connected to the dash middle cross member 404 on the dash panel 400. The two front longitudinal beams 300, the front impact beam 200 and the dash middle cross member 404 form a closed-loop force transmission structure. The front longitudinal beams 300 can also transmit another part of the impact force to the dash panel 400 and the dash middle cross member 404. The dash middle cross member 404 can further resolve the impact force, thus reducing the intrusive amount of the dash panel 400 and providing sufficient surviving space for passengers.

The dash middle cross member 404 is arranged on the front surface of the dash panel 400. Specifically, the dash middle cross member 404 is connected to the dash lower panel 405, and the dash lower panel 405 is provided with the dash lower panel reinforcing rib. The dash lower panel reinforcing rib and the dash middle cross member 404 are separated by the dash lower panel 405 and partially overlap, such that the impact force transmitted to the dash panel 400 can be transmitted by means of the dash lower panel reinforcing rib. The dash lower panel reinforcing rib can transmit the impact force to the floor upper longitudinal beam 1700, and the floor upper longitudinal beam 1700 can further transmit the impact force to the seat front cross member 1601. The seat front cross member 1601 can transmit the impact force to both sides thereof, such that the seat front cross member 1601 can transmit a part of the impact force to the rocker panel 800 at the outer side and transmit another part of the impact force to the floor centre aisle 1000 at the inner side, which can effectively enrich the transmission path of the impact force on the dash panel 400 and the floor, effectively disperse the impact force and improve the crash performance of the vehicle.

It should be noted that the seat rear cross member 1602 is connected between the floor centre aisle 1000 and the rocker panel 800. Thus, a part of force transmitted to the floor centre aisle 1000 and the rocker panel 800 can also be transmitted backwards to the seat rear cross member 1602, thereby further enriching the transmission path.

In summary, the number of the force transmission paths on the dash panel 400 is generally five, the first path is the dash middle cross member 404, the second path is the dash upper cross member 402, the dash lower vertical member 403, and the dash centre aisle 401, the third path is the dash lower panel reinforcing rib and the floor upper longitudinal beam 1700, the fourth path is the connecting piece 1500 and the side wall 1400, and the fifth path is the A-pillar 100 and the side wall 1400.

In the direction of the floor, the rear end of the front longitudinal beam 300 is also connected to the rocker panel 800, the front floor longitudinal beam 500, and the floor centre aisle 1000. As illustrated in FIG. 12, the rocker panel 800, the front floor longitudinal beam 500, and the floor centre aisle 1000 are arranged in a trifurcate structure. Specifically, a front torsion box 801 is arranged between the rocker panel 800 and the rear end of the front longitudinal beam 300, and the centre aisle connecting plate 1002 is arranged between the floor centre aisle 1000 and the rear end of the front longitudinal beam 300.

Thus, the impact force transmitted to the rear end of the front longitudinal beam 300 can be further transmitted in three directions, in one direction, the force is transmitted to the rocker panel 800, in another one direction, the force is transmitted to the front floor longitudinal beam 500, and in the last one direction, the force is transmitted to the floor centre aisle 1000. The rocker panel 800 and the front floor longitudinal beam 500 can transmit the force backwards to the rear floor longitudinal beam 900. The floor centre aisle 1000 is provided with the centre aisle force transmission path 1001, and the centre aisle force transmission path 1001 can transmit the force to the rear floor longitudinal beam 900 by means of the rear floor longitudinal beam 1100. The rear floor longitudinal beam 900 then transmits the force backwards to the subframe. The transmission path of the impact force on the floor can be obviously enriched, thereby effectively resolving the applied force and enhancing the impact force.

In summary, there are roughly four force transmission paths on the floor, the first path is the front torsion box 801, the rocker panel 800, and the rear floor longitudinal beam 900, the second path is the front floor longitudinal beam 500, and the rear floor longitudinal beam 900, the third path is the centre aisle connecting plate 1002, the rear floor cross member 1100, and the rear floor longitudinal beam 900, and the fourth path is the floor upper longitudinal beam 1700, the seat front cross member 1601, the rocker panel 800, and the rear floor longitudinal beam 900.

In summary, when the vehicle body 10000 of the present disclosure is in vehicle frontal crash, the impact force can be transmitted from the front impact beam 200 to the rear subframe, such that the force transmission path is long, the force transmission effect is good, more force transmission paths are provided, and the force resolving effect is better, thus the structure reliability of the vehicle body 10000 can be effectively improved, and the crash performance of the vehicle can be improved.

It should be noted that the above-mentioned contents are illustrated by taking the vehicle in frontal crash as an example, but those skilled in the art should be clearly informed of the transmission process in side crash according to the above-mentioned contents.

For example, when the vehicle is in side crash, the impact force can be transmitted to the A-pillar 100 by means of the side wall 1400, and the A-pillar 100 transmits the impact force to the front longitudinal beam 300 by means of a plurality of force transmission paths. The A-pillar 100 can also transmit the impact force to the dash panel 400, and the dash panel 400 transmits the force to the floor by means of a plurality of force transmission paths.

For another example, when the vehicle is in side crash, the impact force can be transmitted forwards to the front longitudinal beam 300 by means of the rocker panel 800, and the front longitudinal beam 300 can transmit the force to the A-pillar 100 by means of a plurality of force transmission paths. The impact force can also be transmitted backwards to the subframe by means of the rear floor longitudinal beam 900.

The above is only a preferable embodiment of the present disclosure, which is not construed to limit the present disclosure. Any modification, equivalent replacement, improvement made within the spirit and principles of the present disclosure should be included in the scope of protection of the present disclosure.

The invention claimed is:

1. A vehicle body, comprising:
   two A-pillars;
   a front impact beam;
   two front longitudinal beams having front ends connected to two ends of the front impact beam respectively, each of the front longitudinal beams being connected to the A-pillar at same side therewith by means of a plurality of force transmission paths;
   a dash panel connected to rear ends of the two front longitudinal beams, having a lower portion provided with a dash centre aisle, and connected to the two A-pillars;
   a dash upper cross member arranged at an upper portion of the dash panel;
   a dash lower vertical member having an upper end connected to the dash upper cross member and a lower end extending to the dash centre aisle;
   two front floor longitudinal beams, each of the front floor longitudinal beams having a front end connected to the rear end of the front longitudinal beam at same side therewith and having a linear configuration; and
   two upper side beams, each of the upper side beams having a rear end connected to the A-pillar at same side therewith, and a plurality of connecting parts being provided between each of the upper side beams and the front longitudinal beam at same side therewith to enable the front longitudinal beam to be connected to the A-pillar by means of the plurality of force transmission paths,
   wherein the plurality of connecting parts comprise a second bracket connected between the upper side beam and the front longitudinal beam at same side therewith, and connection between the second bracket and the upper side beam is arranged at a rear upper position relative to connection between the first bracket and the upper side beam, and
   wherein the second bracket comprises a first connecting piece and a second connecting piece, the first connecting piece extends in a left-right direction and is connected between the upper side beam and the second connecting piece, and the second connecting piece extends in an upper-lower direction and has a lower end connected to the front longitudinal beam.

2. The vehicle body according to claim 1, wherein the plurality of connecting parts comprise a first bracket extending in a left-right direction, having an inner end connected to an outer side of the front longitudinal beam, and adjacent to the front end of front longitudinal beam, and the upper side beam has a front lower end connected to an outer end of the first bracket.

3. The vehicle body according to claim 2, wherein the first bracket comprises a first bracket plate and a second bracket plate, the first bracket plate is in a shape of U, and the second bracket plate is fixed to an opening of the first bracket plate and seals the opening.

4. The vehicle body according to claim 1, further comprising a front end closing structure connected to the front longitudinal beam by means of the second connecting piece.

5. The vehicle body according to claim 1, wherein the first bracket, the second bracket, a portion of the upper side beam located between the first bracket and the second bracket, and a portion of the front longitudinal beam located between the first bracket and the second bracket form a three-dimensional quadrangle.

6. The vehicle body according to claim 1, wherein the plurality of connecting parts further comprise a third bracket connected between the upper side beam and the front longitudinal beam at same side, and connection between the third bracket and the upper side beam is arranged at a rear portion relative to connection between the second bracket and the upper side beam.

7. The vehicle body according to claim 6, wherein the upper side beam comprises an arc segment and a straight segment, the arc segment is connected in front of the straight segment, the first bracket and second bracket are connected to the arc segment, the third bracket is connected to the straight segment, and the straight segment is connected to the A-pillar in rear.

8. The vehicle body according to claim 1, further comprising:
   two rocker panels, each of the rocker panel having a front end connected to the rear end of the front longitudinal beam at same side therewith; and
   two rear floor longitudinal beams, each of the rear floor longitudinal beams being connected to a rear end of the front floor longitudinal beam at same side therewith and a rear end of the rocker panel to make the front floor longitudinal beam, the rocker panel, and the rear floor longitudinal beam form a closed-loop force transmission structure.

9. The vehicle body according to claim 8, wherein the rear floor longitudinal beam comprises a front segment, a middle segment, and a rear segment, the front segment is connected to the rear end of the front floor longitudinal beam, the middle segment is connected to the rear end of the rocker panel, the rear segment extends backwards from the middle segment to a rear subframe, and a width of the middle segment is larger than a width of the front segment, and an outer wall of the middle segment abuts an inner wall of the rocker panel and is fixed to the inner wall of the rocker panel.

10. The vehicle body according to claim 8, further comprising a floor centre aisle and a rear floor cross member, the floor centre aisle being connected between the rear end of the front longitudinal beam and the rear floor cross member, the rear floor cross member being further connected to the rear floor longitudinal beam to form a closed-loop force transmission structure with the floor centre aisle, the front floor longitudinal beam, and the rear floor longitudinal beam.

11. The vehicle body according to claim 10, wherein the floor centre aisle is provided with a centre aisle force transmission path extending along a front-rear direction, and the centre aisle force transmission path is a groove.

12. The vehicle body according to claim 1, wherein when a vehicle is in frontal crash, an impact force on the front impact beam is transmitted to the two front longitudinal beams in rear, each of the front longitudinal beams then transmits the impact force to the dash panel, to the A-pillar at same side therewith by means of the plurality of force transmission paths at the same side, and also to the front floor longitudinal beam at the same side, and the impact force transmitted to the A-pillar is transmitted to the dash centre aisle by means of the dash upper cross member and the dash lower vertical member.

13. The vehicle body according to claim 1, wherein when a vehicle is in side crash, the A-pillar located at a crash side transmits an impact force to the other side by means of the dash upper cross member, and to the dash lower vertical member and the dash centre aisle by means of the dash upper cross member.

14. The vehicle body according to claim 8, wherein when a vehicle is in frontal crash, an impact force on the front impact beam is transmitted to the two front longitudinal beams in rear, each of the front longitudinal beams then transmits the impact force to the dash panel, to the A-pillar at same side therewith by means of the plurality of force transmission paths at the same side, and also to the front floor longitudinal beam at the same side, and the impact force transmitted to the A-pillar is transmitted to the dash centre aisle by means of the dash upper cross member and the dash lower vertical member; and
   the impact force transmitted to the front longitudinal beam is also transmitted to the rear floor longitudinal beam by means of the rocker panel at the same side.

15. The vehicle body according to claim 10, wherein when a vehicle is in frontal crash, an impact force on the front impact beam is transmitted to the two front longitudinal beams in rear, each of the front longitudinal beams then transmits the impact force to the dash panel, to the A-pillar at the same side therewith by means of the plurality of force transmission paths at the same side, and also to the front floor longitudinal beam at the same side, the impact force transmitted to the A-pillar is transmitted to the dash centre aisle by means of the dash upper cross member and the dash lower vertical member; and
   the impact force transmitted to the front longitudinal beam is also transmitted to the rear floor longitudinal beam by means of the floor centre aisle and the rear floor cross member at the same side.

16. A vehicle, comprising a vehicle body comprising:
two A-pillars;
a front impact beam;
two front longitudinal beams having front ends connected to two ends of the front impact beam respectively, each of the front longitudinal beams being connected to the A-pillar at same side therewith by means of a plurality of force transmission paths;
a dash panel connected to rear ends of the two front longitudinal beams, having a lower portion provided with a dash centre aisle, and connected to the two A-pillars; and
two upper side beams, each of the upper side beams having a rear end connected to the A-pillar at same side therewith,
wherein a plurality of connecting parts is provided between each of the upper side beams and the front longitudinal beam at same side therewith and comprises a first bracket and a second bracket, connection between the second bracket and the upper side beam is arranged at an rear upper position relative to connection between the first bracket and the upper side beam, the second bracket comprises a first connecting piece and a second connecting piece, the first connecting piece extends in a left-right direction and is connected between the upper side beam and the second connecting piece, and the second connecting piece extends in an upper-lower direction and has a lower end connected to the front longitudinal beam.

17. A vehicle body, comprising:
two A-pillars;
a front impact beam;
two front longitudinal beams having front ends connected to two ends of the front impact beam respectively, each of the front longitudinal beams being connected to the A-pillar at same side therewith by means of a plurality of force transmission paths;
a dash panel connected to rear ends of the two front longitudinal beams, having a lower portion provided with a dash centre aisle, and connected to the two A-pillars; and
two upper side beams, each of the upper side beams having a rear end connected to the A-pillar at same side therewith,
wherein a plurality of connecting parts is provided between each of the upper side beams and the front longitudinal beam at same side therewith and comprises a first bracket and a second bracket, connection between the second bracket and the upper side beam is arranged at an rear upper position relative to connection between the first bracket and the upper side beam, the first bracket, the second bracket-, a portion of the upper side beam located between the first bracket and the second bracket, and a portion of the front longitudinal beam located between the first bracket and the second bracket form a three-dimensional quadrangle.

* * * * *